(12) United States Patent
Truan et al.

(10) Patent No.: US 7,540,436 B2
(45) Date of Patent: *Jun. 2, 2009

(54) TRUCK BED MOUNTED SPREADER

(75) Inventors: Charles J Truan, 2329 N. Washington, Royal Oak, MI (US) 48073; James Truan, 3916 Ravena, Royal Oak, MI (US) 48073; Joshua Scott, 412 Oakdale, Royal Oak, MI (US) 48067; Paul Mandrik, 35506 Seville, Clinton Township, MI (US) 48035

(73) Assignees: Charles J Truan, Royal Oak, MI (US); James Truan, Royal Oak, MI (US); Joshua Scott, Royal Oak, MI (US); Paul Mandrik, Clinton Township, MI (US)

( * ) Notice: Subject to any disclaimer, the term of this patent is extended or adjusted under 35 U.S.C. 154(b) by 374 days.

This patent is subject to a terminal disclaimer.

(21) Appl. No.: 11/157,314

(22) Filed: Jun. 21, 2005

(65) Prior Publication Data
US 2005/0252999 A1    Nov. 17, 2005

Related U.S. Application Data

(63) Continuation-in-part of application No. 10/162,158, filed on Jun. 4, 2002, now Pat. No. 6,953,163, which is a continuation-in-part of application No. 09/520,522, filed on Mar. 8, 2000, now Pat. No. 6,422,490.

(60) Provisional application No. 60/181,277, filed on Feb. 9, 2000, provisional application No. 60/128,342, filed on Apr. 8, 1999, provisional application No. 60/123,663, filed on Mar. 9, 1999.

(51) Int. Cl.
A01C 15/00    (2006.01)

(52) U.S. Cl. .................... 239/661; 239/67; 239/69; 239/659; 239/663; 239/668; 239/672; 239/675; 239/677; 239/681; 239/687; 222/161; 222/226

(58) Field of Classification Search ............... 239/67, 239/69, 661, 663, 659, 672, 675, 676, 677, 239/681, 684, 687, 683, 668; 222/160, 161, 222/196, 198, 199, 226
See application file for complete search history.

(56) References Cited

U.S. PATENT DOCUMENTS 733,628 A    7/1903    Cramer (Continued)

OTHER PUBLICATIONS

Smith, Brian "Buyers Products Adds 'Salt Dogg' 100% Poly Hopper Spreader", Aug. 23, 2004.

(Continued)

Primary Examiner—Steven J Ganey
(74) Attorney, Agent, or Firm—Dickinson Wright PLLC

(57) ABSTRACT

A spreader assembly for spreading a material and for mounting in a bed of a truck is disclosed. The assembly includes a hopper and a frame for supporting the hopper in the bed of the truck. The hopper has a length extending between a front end and a rear end sized for placing in the bed of the truck to hold material for spreading and has an outlet spout with an opening for discharging material therefrom. The hopper and the frame are each formed from a thermoplastic material.

20 Claims, 20 Drawing Sheets

U.S. PATENT DOCUMENTS

| | | | |
|---|---|---|---|
| 875,539 | A | 12/1907 | Little |
| 2,003,417 | A | 8/1935 | Andress |
| 2,076,851 | A | 4/1937 | Larsen |
| 2,174,348 | A | 9/1939 | Damond |
| 2,254,448 | A | 9/1941 | Pursel |
| 2,631,969 | A | 3/1953 | Klueger |
| 2,633,133 | A | 3/1953 | Higgins |
| 2,858,011 | A | 10/1958 | Wahl |
| 3,155,288 | A | 11/1964 | Landgraf |
| 3,204,832 | A | 9/1965 | Barber |
| 3,212,624 | A | 10/1965 | Hess |
| 3,322,429 | A | 5/1967 | Cervelli |
| 3,559,894 | A | 2/1971 | Murray |
| 3,746,264 | A | 7/1973 | Diener et al. |
| 3,819,120 | A | 6/1974 | Walker |
| 3,993,225 | A | 11/1976 | Manni |
| 4,013,196 | A | 3/1977 | Hines, Jr. |
| 4,029,237 | A | 6/1977 | Miconi |
| 4,270,675 | A | 6/1981 | Wicks et al. |
| 4,363,447 | A | 12/1982 | Schulze |
| 4,470,524 | A | 9/1984 | Semenenko |
| 4,484,852 | A | 11/1984 | Anderson |
| 4,523,280 | A | 6/1985 | Bachman |
| 4,607,979 | A | 8/1986 | Morrison |
| 4,657,431 | A | 4/1987 | Morrison |
| 4,712,717 | A | 12/1987 | Egerdahl |
| 4,790,457 | A | 12/1988 | Morse et al. |
| 4,842,202 | A | 6/1989 | Van Der Lely et al. |
| 4,850,515 | A | 7/1989 | Cleland |
| D314,578 | S | 2/1991 | Morrison |
| 5,046,664 | A | 9/1991 | Van Der Lely et al. |
| 5,054,658 | A | 10/1991 | Aronie |
| D335,267 | S | 5/1993 | Upshaw |
| H1205 | H | 7/1993 | Pearce et al. |
| 5,234,128 | A | 8/1993 | Hill |
| 5,288,028 | A | 2/1994 | Spivak et al. |
| 5,340,033 | A | 8/1994 | Whitell |
| 5,381,967 | A | 1/1995 | King |
| 5,397,172 | A | 3/1995 | Musso, Jr. et al. |
| D368,887 | S | 4/1996 | Upshaw |
| 5,649,666 | A | 7/1997 | Lewis |
| 5,669,531 | A | 9/1997 | Hagemeyer |
| 5,690,466 | A | 11/1997 | Gaddis et al. |
| 5,842,648 | A | 12/1998 | Havlovitz et al. |
| 5,842,649 | A | 12/1998 | Beck et al. |
| 5,927,617 | A | 7/1999 | Musso, Jr. et al. |
| 5,947,391 | A | 9/1999 | Beck et al. |
| 5,988,534 | A | 11/1999 | Kost et al. |
| 6,027,052 | A | 2/2000 | Strieker et al. |
| 6,047,908 | A | 4/2000 | Seymour et al. |
| 6,068,108 | A | 5/2000 | Dudley |
| 6,068,200 | A | 5/2000 | Kime |
| 6,089,478 | A | 7/2000 | Truan et al. |
| 6,092,966 | A | 7/2000 | Martin et al. |
| 6,145,709 | A | 11/2000 | Hogan et al. |
| 6,179,230 | B1 | 1/2001 | Geroux et al. |
| D438,836 | S | 3/2001 | Reiter |
| 6,220,532 | B1 | 4/2001 | Manon et al. |
| D452,472 | S | 12/2001 | Darbishire |
| D458,209 | S | 6/2002 | Darbishire |
| 6,398,137 | B1 | 6/2002 | Manon et al. |
| 6,401,983 | B1 * | 6/2002 | McDonald et al. ....... 222/181.2 |
| 6,702,208 | B1 | 3/2004 | Hadler et al. |
| 6,715,703 | B2 | 4/2004 | Kost et al. |
| 6,722,590 | B2 | 4/2004 | Kost et al. |
| 6,793,154 | B2 | 9/2004 | Kost |
| 2003/0156933 | A1 | 8/2003 | Arne et al. |

OTHER PUBLICATIONS

Chase, George G., Solids Notes, pp. 10-1 through 10-26, The University of Akron.

Angelos's Supplies, Inc.; Salt Dogg Poly Hopper Spreaders website print out, 4 Pages, Oct. 20, 2004 http://www.angelos-supplies.com/plowparts/salt-dogg.pg.

* cited by examiner

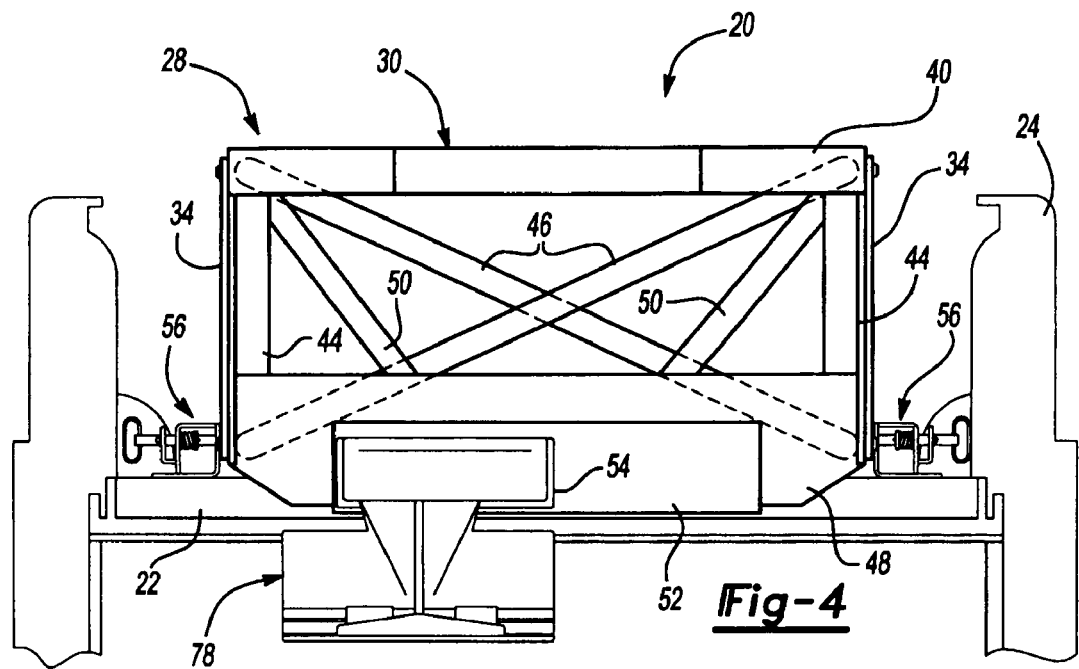
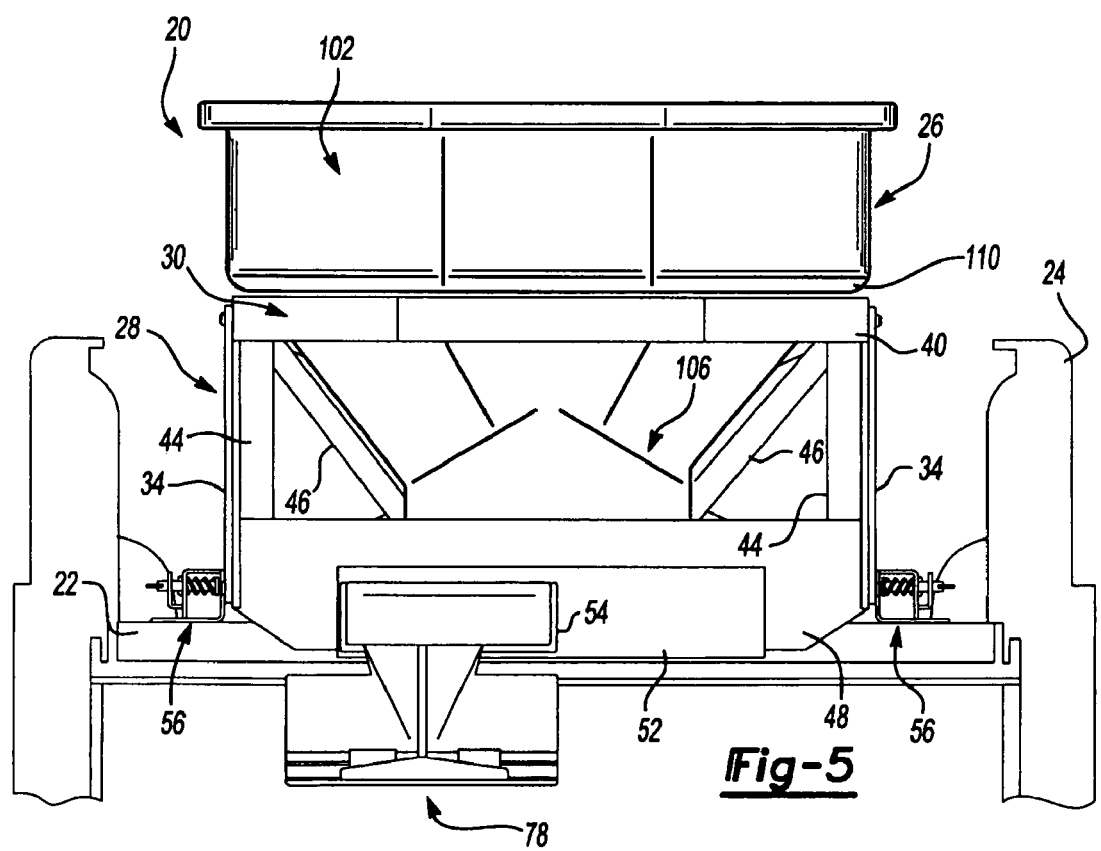

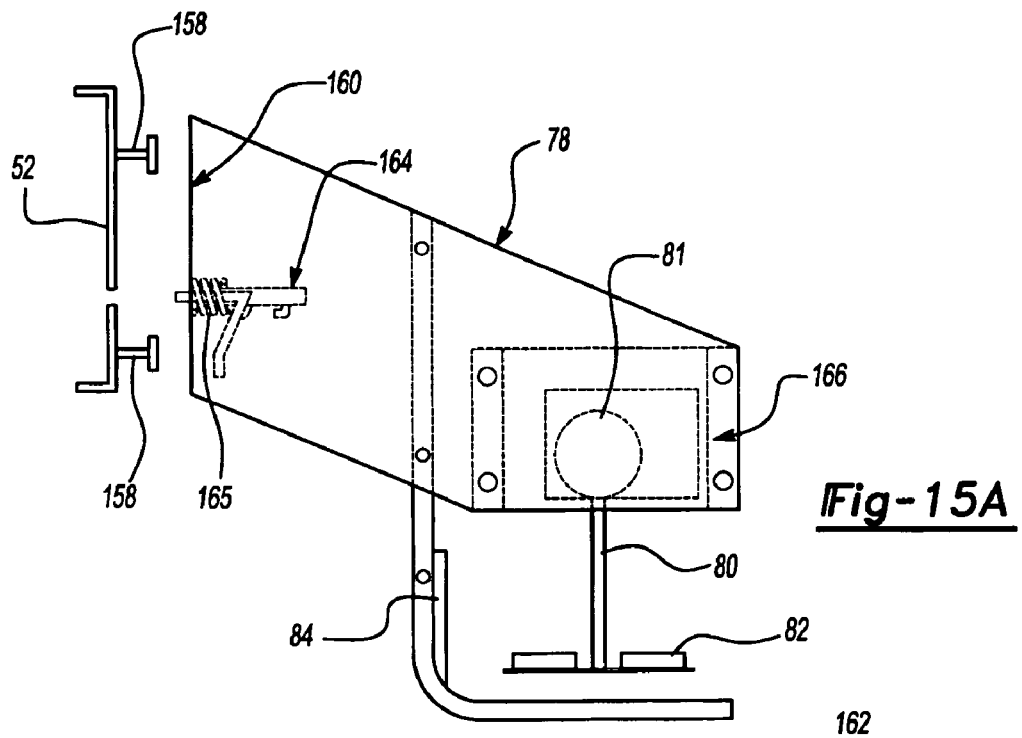
*Fig-15A*
*Fig-15B*
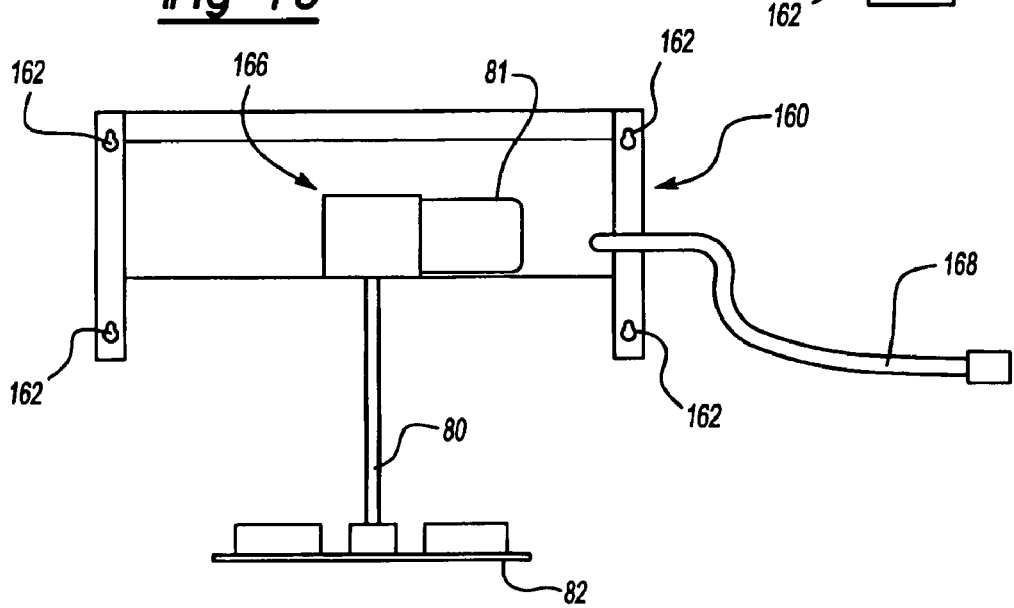
*Fig-16*

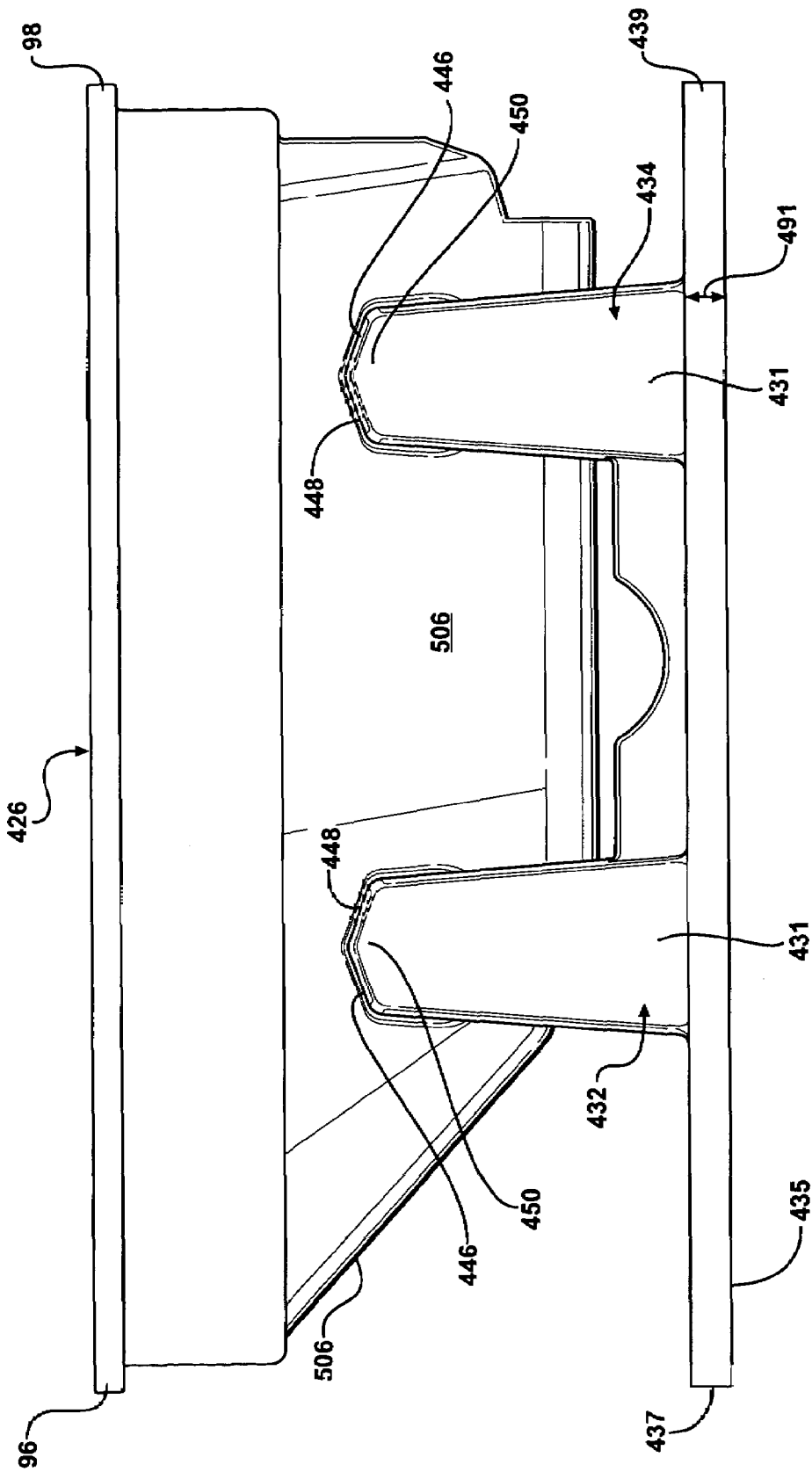

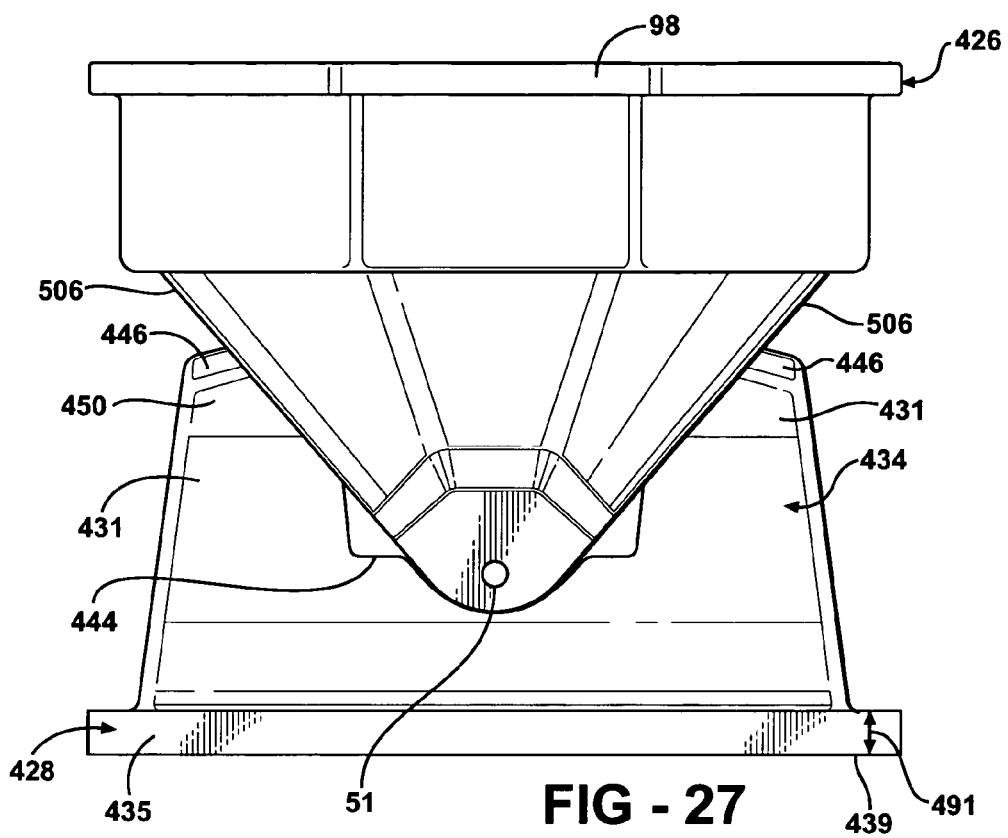
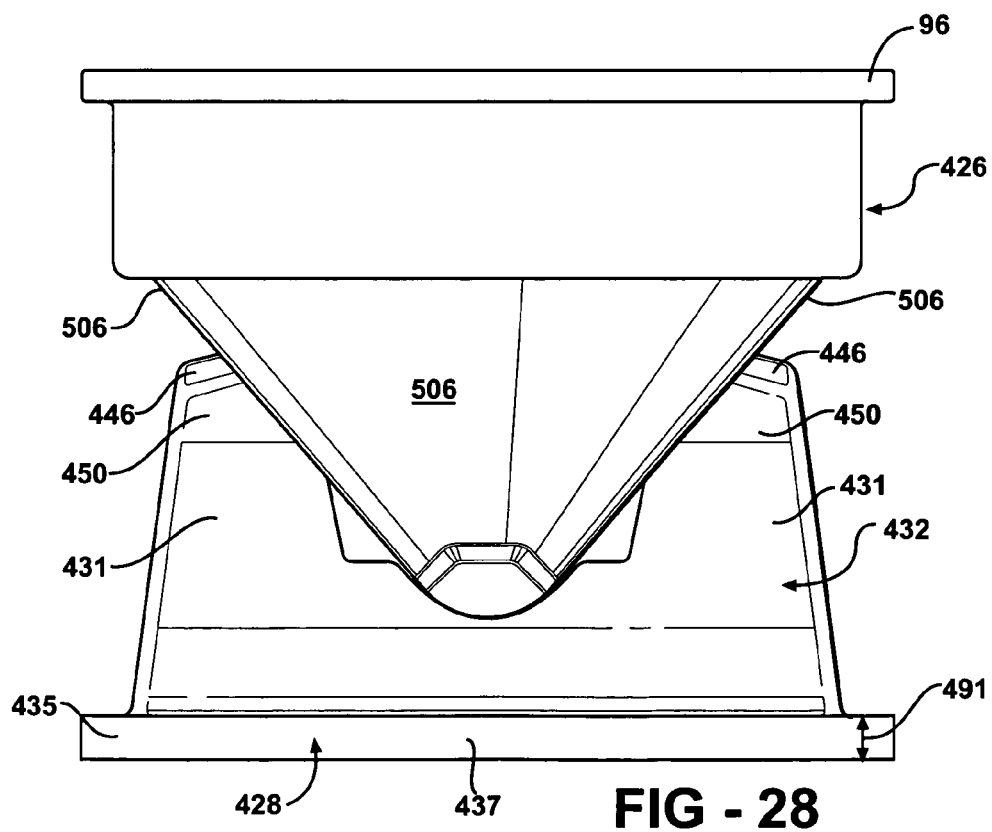

TRUCK BED MOUNTED SPREADER

CROSS REFERENCE TO RELATED APPLICATION

This application is a Continuation-in-Part of U.S. patent application Ser. No. 10/162,158 filed Jun. 4, 2002, which is a Continuation-in-Part of U.S. patent application Ser. No. 09/520,522 filed Mar. 8, 2000, which claims the benefit of Provisional Patent Application Nos. 60/123,663 filed Mar. 9, 1999, 60/128,342 filed Apr. 8, 1999, and 60/181,277 filed Feb. 9, 2000.

BACKGROUND OF THE INVENTION

1. Field of the Invention

The general invention relates to spreaders, and more particularly to a bed mounted spreader having an improved auger design.

2. Description of the Related Art

Conventional related art spreader assemblies are generally not releasably mounted to a truck bed. These spreaders have augers or similar devices to convey a material out of the spreader. The materials tend to cavitate near the augers and the flow of material out of the spreader assembly is retarded or prevented. The spreaders are typically formed of heavy duty metals that are able to withstand corrosive environments that can be encountered when spreading certain materials, such as bulk salt. These spreader assemblies are generally integrally formed within the bed and have a conveyor belt extending the entire length of the bed to deliver material to a spinner. One related art spreader, shown in U.S. Pat. No. 5,927,617, has an integrally formed hopper in the bed with a conveyor belt system for delivering the material to the spinner. However, the '617 Patent utilizes a dumping mechanism to deliver the material to the conveyor belt. Another spreader, shown in U.S. Pat. No. 5,690,466, has sloping side walls and a flat bottom that delivers material to an auger which runs the length of the truck bed.

The related art spreaders are characterized by one or more inadequacies. Specifically, none of the related art spreaders provide for a spreader having a large capacity hopper and a frame releasably mounted in the bed of the truck. The frames are very heavy and cumbersome and require up to 5 hours to remove from the back of the vehicle. The spreaders are expensive to manufacture and difficult to maintain. It would be advantageous to provide a spreader that was removable from the truck bed and cost effective to manufacture and easily maintained.

SUMMARY OF THE INVENTION AND ADVANTAGES

The subject invention provides a spreader assembly for mounting in a bed of a truck. The assembly comprises a hopper and a frame for supporting the hopper in the bed of the truck. The hopper has a length extending between a front end and a rear end sized for placing in the bed of the truck to hold material for spreading and has an outlet spout with an opening for discharging material therefrom. The hopper and the frame are each formed from a thermoplastic material.

Accordingly, the subject invention overcomes the inadequacies that characterize the related art spreaders. The subject invention provides a large capacity hopper and frame that is light-weight and that can withstand corrosive materials. Further, the frame can be replaced without having to replace the entire assembly. The frame is also easily removable and can be removed from the back of the vehicle in less than an hour. The frame distributes the weight of the hopper evenly across the rear axle of the vehicle, which allows a wider variety of vehicles to utilize the subject invention. The weight distribution allows the truck to be more responsive and have better "road action" while the hopper is both full and empty.

BRIEF DESCRIPTION OF THE DRAWINGS

Other advantages of the present invention will be readily appreciated as the same becomes better understood by reference to the following detailed description when considered in connection with the accompanying drawings wherein:

FIG. 4 is an end view of the truck having the frame releasably mounted to the bed without the hopper;

FIG. 5 is an end view of the truck having the frame releasably mounted to the bed and the frame is supporting the hopper;

FIG. 15A is a side view of another embodiment of the spinner;

FIG. 15B is a front view of a spinner bracket;

FIG. 16 is a front view of the spinner illustrated in FIG. 15A;

FIG. 26 is a side view of the spreader assembly shown in FIG. 24;

FIG. 27 is a rear view of the spreader assembly shown in FIG. 24;

FIG. 28 is a front view of the spreader assembly shown in FIG. 24; and

DETAILED DESCRIPTION OF THE INVENTION

Referring to the Figures, wherein like numerals indicate like or corresponding parts throughout the several views, a spreader assembly for spreading a material and for mounting to a bed 22 of a truck 24 is shown generally at 20. The spreader assembly 20 is ideally suited for spreading materials such as sand, salt, seed, fertilizer, and the like. It is to be understood that the spreader assembly 20, being shown in the bed 22 of a pick-up truck 24, is adaptable for use with other vehicles, such as trailers, stake trucks, flat bed trucks, and the like.

Figure 1:
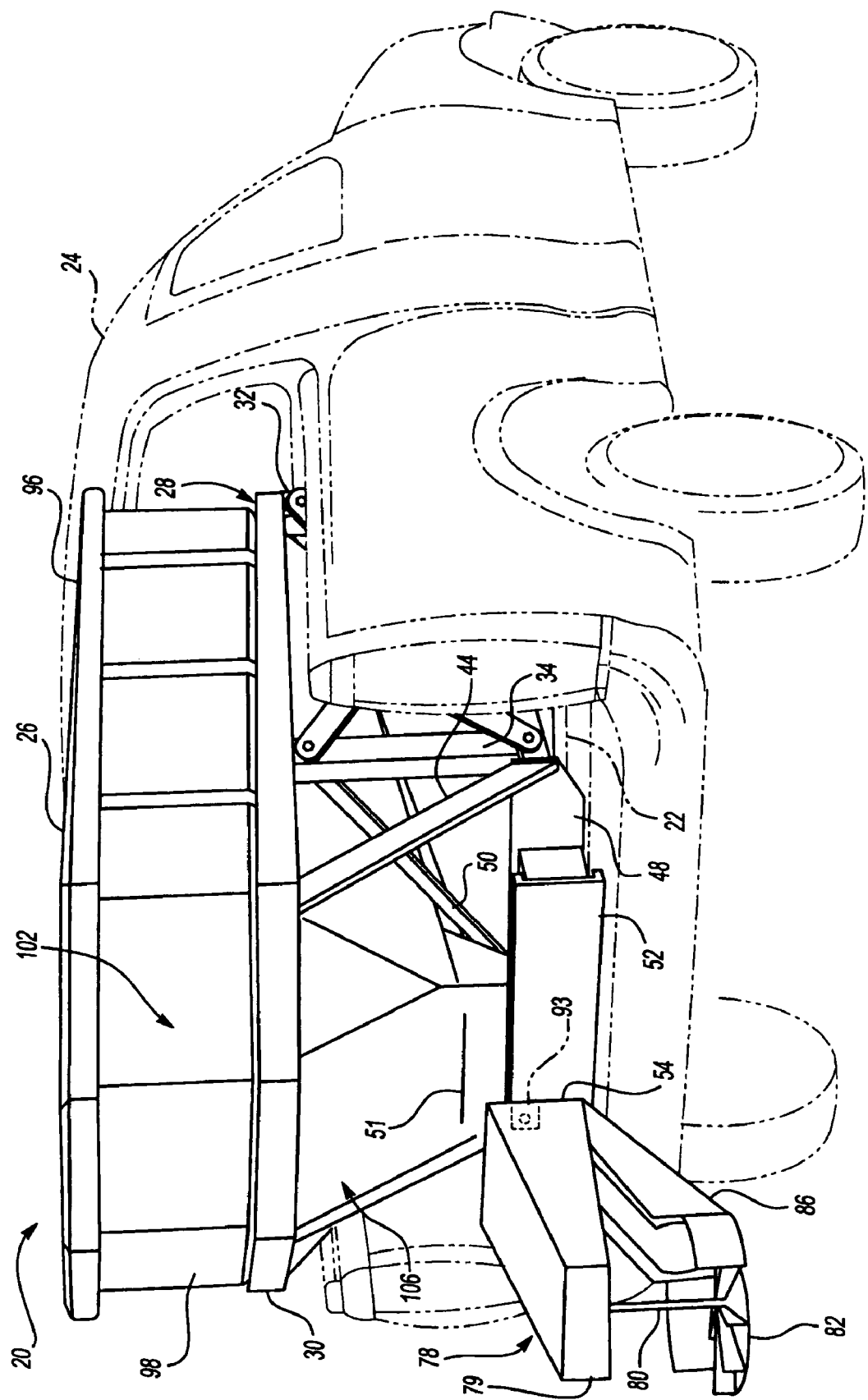
FIG. 1 is a perspective view of a pick-up truck having a bed mounted spreader assembly.
Figure 2:
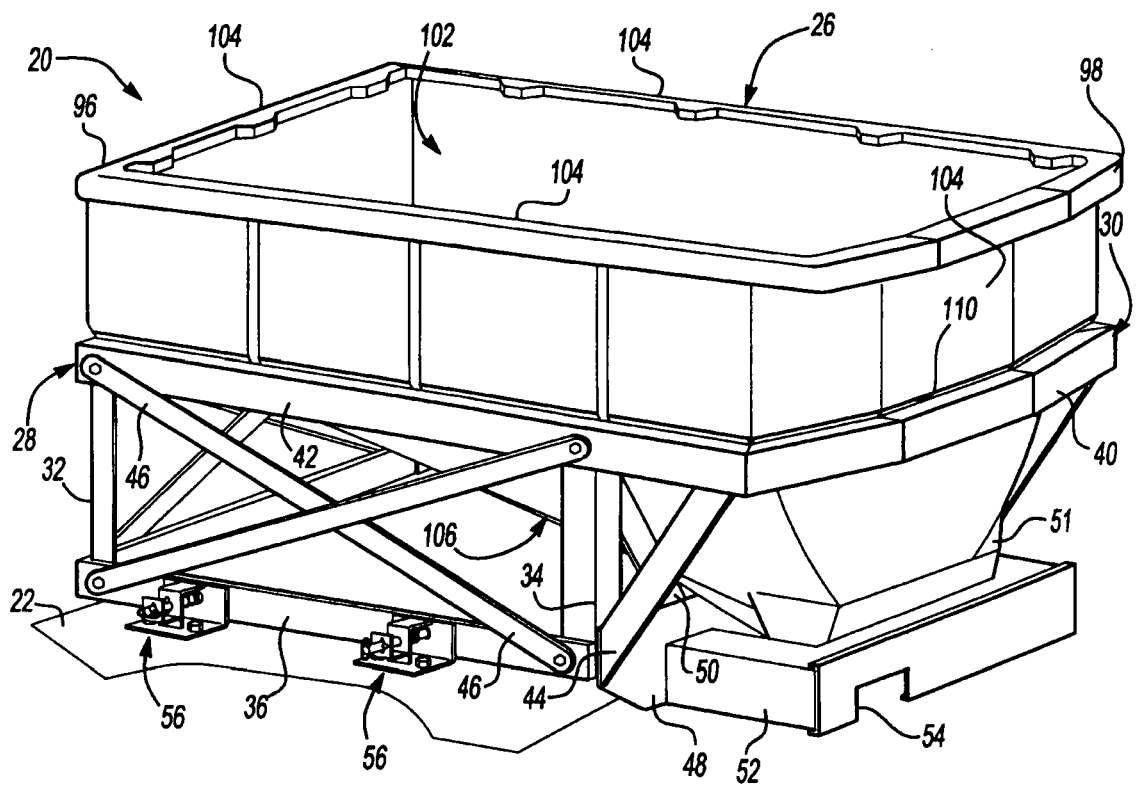
FIG. 2 is a perspective view of a hopper supported by a frame and being releasably mounted to the bed of the truck.

The assembly 20 includes a hopper 26 and a frame 28 as shown in FIGS. 1 and 2 being mounted into the bed 22. The frame 28 has an upper rail 30 for supporting the hopper 26 in the bed 22 of the truck 24, shown best in FIG. 3. The frame 28 also includes a pair of front posts 32 and a pair of rear posts 34 extending downwardly from the upper rail 30 for engaging the bed 22 of the truck 24. The frame 28 further includes a lower rail 36 connected to the front posts 32 and the rear posts 34 for providing additional support for the hopper 26. The lower rail 36 may be a continuous piece or individual pieces. Preferably, the lower rail 36 includes four pieces disposed between the rear posts 34 and the front posts 32. The frame 28 is sectional and preferably comes in eight pieces that are secured together to form the frame 28. Therefore, when one piece is corroded, it is removed and replaced with a new piece. The frame 28, for a pick-up truck, is releasably mounted between the wheel wells of the truck bed 22. The frame 28 distributes the weight of the material evenly across the rear axle of the truck 24, as shown in FIGS. 4 and 5.

Figure 3:
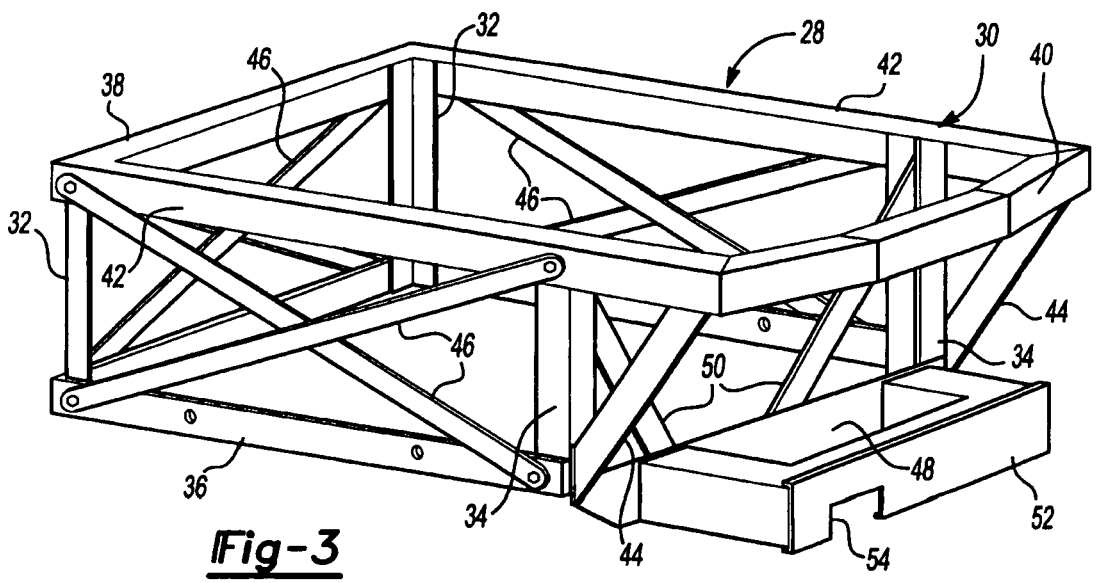
FIG. 3 is a perspective view of the frame without the hopper.

The upper rail 30 extends in a cantilevered fashion from the rear posts 34 to support the outlet spout outside the bed 22 of the truck 24. Because the upper rail 30 extends in the cantilevered fashion, the rear end of the assembly 20 is outside the truck bed 22 and allows the material to be spread. It is preferable that the upper rail 30 extends continuously from the front posts 32 to the rear posts 34 for extending outside the bed 22 of the truck 24. The upper rail 30, the lower rail 36, and the posts 32, 34 may be constructed of any material, such as plastic or metal, so long as the material is strong enough to support the weight of the hopper 26 and the material. The upper rail 30 further includes a front rail member 38, a rear rail member 40, and two side rail members 42 interconnecting the front rail member 38 to the rear rail member 40. In one embodiment, the upper rail 30 may be a single integral piece. Alternately, each rail member may be an individual piece fastened together to form the upper rail 30 and may be fastened by any methods, such as welding, bolting, and the like. As best shown in FIGS. 1 and 3, the rear rail member 40 is arcuate and is formed with three sections to conform to the hopper 26 and support the portion of the hopper 26 outside the bed 22 of the truck 24.

The frame 28 further includes a diagonal support 44 extending between the upper rail 30 and the rear posts 34 for providing additional support for the hopper 26 outside the bed 22 of the truck 24. Preferably, the diagonal support 44 extends from the rear rail member 40 diagonally to the rear posts 34. Cross bars 46 extend between the upper rail 30 and each of the posts for providing additional support for the hopper 26. As shown in FIG. 3, two cross bars 46 extend between each of the rear posts 34 and the corresponding front posts 32 and two cross bars 46 extend between the two front posts 32. The diagonal supports 44 and the cross bars 46 may be fastened by any methods known in the art of fastening, such as, but not limited to, welding, bolting, or screwing.

A spout support plate 48 interconnects the diagonal support 44 to the rear posts 34. The spout support plate 48 extends between the pair of rear posts 34 and are preferably welded to the posts. However, it is to be understood that the spout support plate 48 may be fastened otherwise as described above. Hopper supports 50 are connected to the rear posts 34 and at least one of the lower rail 36 and the spout support plate 48 for supporting the hopper 26. Preferably, the hopper supports 50 extend diagonally between the lower rail 36 and the spout plate 48 for engaging the underside of the hopper 26. A spout rail 52 extends from the spout support plate 48 for supporting an outlet spout 51. The spout rail 52 is preferably C-shaped and fastened to the spout support plate 48 at the legs of the C-shape. However, the spout rail 52 may be fastened directly to the rear posts 34. The spout rail 52 also includes an aperture 54 along a face of the spout rail 52. The spout support plate 48 and the spout rail 52 are preferably constructed of metal, but may be any other type of material sufficient to support the weight of the material in the hopper 26 outside the bed 22 of the truck 24 in the cantilevered fashion.

Figure 12:
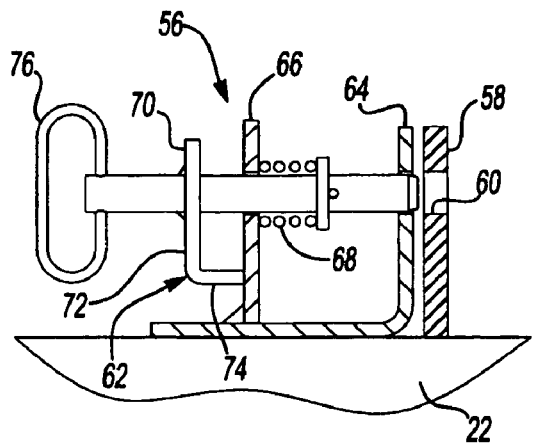
FIG. 12 is a side view of the quick-release connector in an unlocked position.
Figure 13:
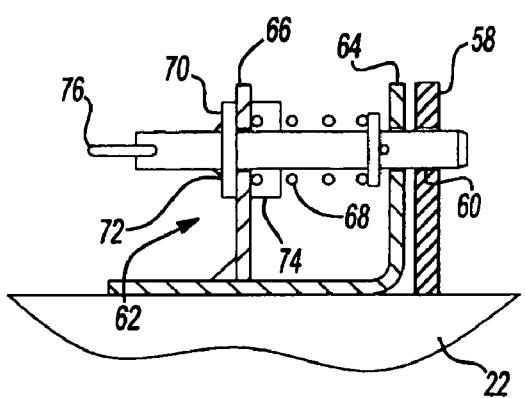
FIG. 13 is a side view of the quick-release connector in a locked position.

The spreader assembly 20 further includes a quick-release connector 56 releasably engaging the frame 28 for securing the assembly 20 to the bed 22 of the truck 24 and for preventing longitudinal movement of the assembly 20 within the bed 22 of the truck 24. Referring to FIGS. 12 and 13, the quick-release connector 56 includes a bracket 58 having a hole 60 and a pin mechanism 62 engaging the hole 60 of the bracket 58 for interconnecting the frame 28 to the bed 22. Either one of the bracket 58 and the pin mechanism 62 may be fastened to the bed 22. In the preferred embodiment, the bracket 58 extends from the frame 28 and the pin mechanism 62 is secured to the bed 22. As shown in FIGS. 2 and 3, the bracket 58 is shown integrally formed with the lower rail 36. However, the bracket 58 may be a separate piece welded to the frame to accommodate different heights of the pin mechanism 62. Even more preferably, the bracket 58 is welded to the frame 28, such as to one of the rails or to the lower rail 36. The pin mechanism 62 may be bolted or screwed to the bed 22 to allow for removal of the pin mechanism 62 while utilizing the truck 24 for different applications.

Referring back to FIGS. 12 and 13, the pin mechanism 62 is further defined as a plate being U-shaped with a first leg 64 and a second leg 66. Each leg has a hole that aligns coaxially with one another for receiving a pin. The pin is urged through the holes by a biasing device 68. The biasing device 68 is preferably a spring engaging the pin and either one of the first and the second legs 64, 66 for biasing the pin through the holes. However, other biasing devices may be utilized as is known in the art of biasing devices. A stop 70 engages the pin and rotates between a locked position and an unlocked position. The stop 70 has a flat portion 72 and a leg portion 74, such that in the locked position the flat portion 72 engages the second leg 66 and in the unlocked position the leg portion 74 engages the second leg 66. A handle 76 is connected to the pin to allow for rotating the stop 70 between the locked position and the unlocked position. It should be appreciated that other quick-release connectors may be utilized without deviating from the subject invention, so long as the frame remains removable from the bed 22. For example, stakes or tabs could be inserted into the bed 22 of the truck 24 to secure the assembly 20 in the stake truck or the quick-release connector 56 may be straps, or chains, attached to frame 28 and the bed 22 to secure the assembly 20.

Figure 14:
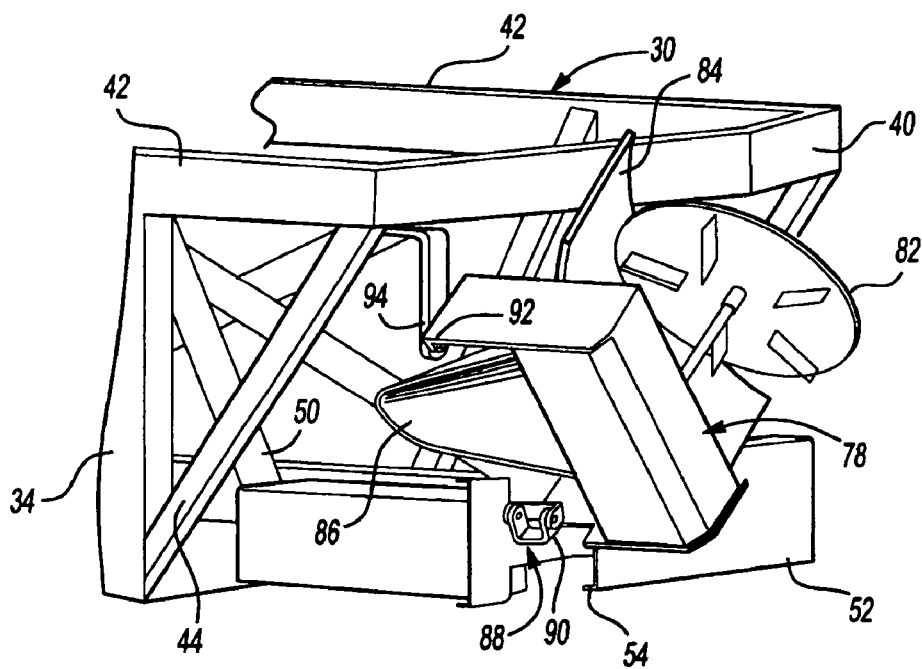
FIG. 14 is a perspective view of a spinner connected to the frame in a storage position.

A spinner 78 is rotatably attached to the spout rail 52 and is moveable between an operating position, shown in FIG. 1, and a storage position, shown in FIG. 14. The spinner 78 includes a vertical drive shaft 80 connected to a disc 82 for receiving material from the outlet spout 51 and for throwing material over a large distribution area, as is known in the spreader arts. A material deflector 84 is also attached to the spinner 78 to assist in directing the material. A funnel 86 extends through the aperture 54 in the spout rail 52 for funneling the material from an opening 101 (shown in FIG. 10) to the disc 82. In the preferred embodiment, the spinner 78 is driven by a motor 81 and transmission assembly, which are mounted outside the hopper 26. A cover 79 is used to protect the motor 81 and transmission from the elements. The motor 81, transmission, and cover 79 may be mounted to the frame 28, preferably by bolts for easy removal and maintenance.

A locking mechanism 88 is utilized for locking the spinner 78 in the operating position and in the storage position. The locking mechanism 88 includes a pivot 90 connected to the spout rail 52, best seen in FIG. 14. The pivot 90 is preferably a U-shaped bracket 58 connected to the spout rail 52 and another U-shaped bracket 58 connected to the spinner 78. When aligned, the U-brackets 58 can be secured, preferably with a pin through the aligned holes. However, other pivot devices known in the art may be incorporated to rotate the spinner 78. A first locking point 93 (phantom in FIG. 1) for locking the spinner 78 in the operating position is disposed on the spout rail 52 and is preferably a hole. Referring to FIG. 14, the spinner 78 has a tab 92 extending therefrom having a hole, which in the operating position is aligned with first locking point. A pin may then be inserted through the holes. A second locking point 94 for locking the spinner 78 in the storage position extends from the upper rail 30. The second locking point 94 is preferably an arm having a hole and is preferably L-shaped. The arm may also extend from the rear posts 34, the hopper supports 50, or the diagonal supports 44 and may be any desired shape. The pin may then be inserted into the tab 92 and the second locking point 94 when aligned. In order to rotate the spinner 78, the spinner 78 may have to be released from both the pivot 90 and the locking point and repositioned. However, the funnel 86 may be made of a flexible material to allow rotation of the spinner 78 without disconnecting the spinner 78 from the pivot 90.

Referring to FIGS. 15A, 15B, and 16, another embodiment of the spinner 78 is illustrated. A pair of rods 158 extends from the spout rail 52 for engaging the spinner 78. The spinner includes a spinner bracket 160 having four keyholes 162 for engaging the rods 158. A spring safety latch 164 engages the spinner bracket 160 to lock the spinner 78 to the spout rail 52 to limit vertical travel. The spring safety latch 164 is moveable between a locking position and an unlocked position. A spring 165 urges the latch 164 into engagement with the spout rail 52. Alternately, the spring 165 may be omitted, and the safety latch 164 may lock the spinner 78 to the spout rail 52. When in the unlocked position, the spinner 78 is completely removable from the spout rail 52. This protects the spinner 78 from being damaged while the truck 24 is performing other operations such as plowing. The motor 81 is housed within a sealed enclosure 166. The sealed enclosure 166 has marine plugs to prevent any salt or other debris from damaging the motor 81. A power cord 168 extends from the sealed enclosure for powering the motor 81. The funnel 86 and deflector 84 direct the material to a 12 o'clock position on the disc 82 to ensure accurate and even distribution of the material.

Figure 6:
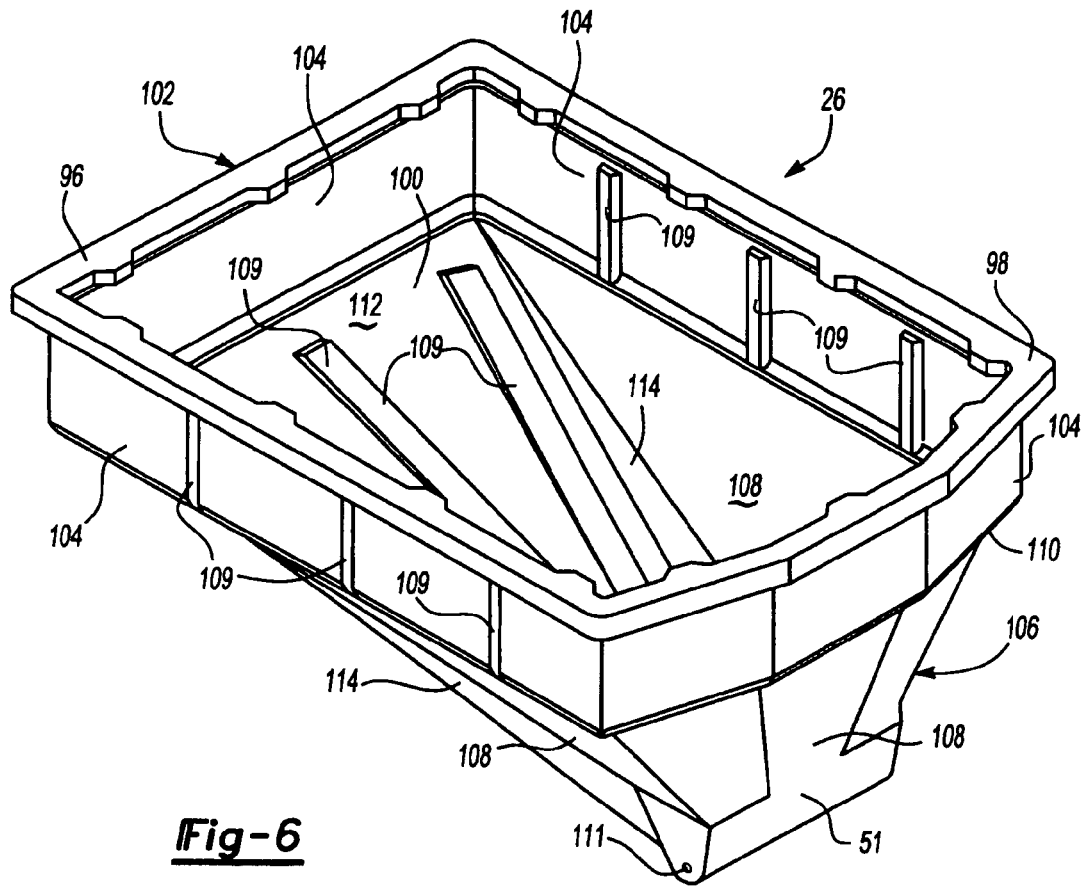
FIG. 6 is a perspective view of the hopper.
Figure 7:
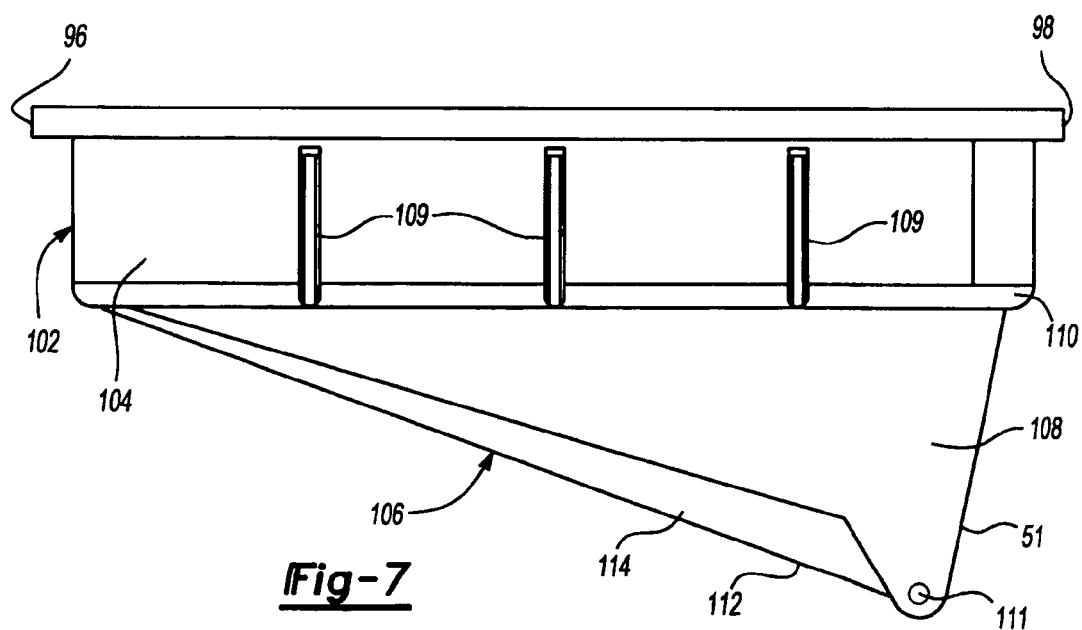
FIG. 7 is a side view of the hopper.

The frame 28, as described above, supports the hopper 26 shown in FIGS. 6 and 7. The hopper 26 is fastened loosely into the frame 28 to allow the hopper 26 to vibrate and allow for quick removal of the hopper 26 when empty. Preferably, the hopper 26 is secured to the frame 28 by two bolts. The hopper 26 has a front end 96, a rear end 98, and a bottom 100. The bottom 100 is downwardly sloping toward the rear end 98 to the outlet spout 51 having the opening 101. The hopper 26 includes an upper portion 102 having four upper walls 104 and a lower portion 106 having the bottom 100 and at least three lower side walls 108. In the preferred embodiment, the lower side walls 108 are slanted.

The hopper 26 is a large capacity hopper and is able to carry more material to be spread, which results in fewer stops to refill the hopper 26 with material. Preferably, the hopper 26 is made of a thermoplastic material, but other materials, such as metal, may be utilized. The thermoplastic material is advantageous because it does not rust, the material does not stick to the sides, and it requires no painting. Also, thermoplastic material is very durable and can be easily removed without damage. The thermoplastic material is also very light such that the frame 28 and hopper 26 weigh 500 lbs. less than most other commercial systems. Preferably, the hopper 26 and frame 28 weigh less than 400 lbs., but this is not intended to limit the subject invention. This allows for additional material, such as a ¼ of a cubic yard or more of material, to be carried by the vehicle. The hopper 26 is preferably formed by rotational molding, or roto-molding. Roto-molding is known to those skilled in the art of molding parts. The roto-molding allows the hopper 26 to be economically manufactured even though the hopper 26 has a larger capacity because the molds are inexpensive and can be made in a single piece.

The intersection of the upper portion 102 and the lower portion 106 defines a flange 110. The flange 110 rests upon the upper rail 30 when the hopper 26 is inserted into the frame 28. Each of the upper walls 104, the bottom 100, and the lower side walls 108 may have a reinforced portion 109 for strengthening the respective part. A cover (not shown) may be supported by the upper walls 104 to prevent the elements from entering the hopper 26. The cover may be a vinyl tarp or a metal or plastic cover. The outlet spout 51 has an access hole 111 for accessing the interior of the outlet spout 51. The access hole 111 allows for maintenance of the spreader assembly 20 without having to remove the material from the hopper 26.

The sloped bottom 100 further includes a first slanted portion 112 having a first slope and a second slanted portion 114 having a second slope with the first slope being different than the second slope. The sloped bottom 100 begins adjacent the upper wall of the front end 96 of the hopper 26. It is to be appreciated that the sloped bottom 100 may extend from a lower side wall and not directly from the upper wall, while still practicing the subject invention. The different slopes allow the material to more easily flow into and toward the outlet spout 51. The first slanted portion 112 has a first width 116 at the front end 96 and a second width 118 at the rear end 98, such that the first width 116 is larger than the second width 118. In other words, the first slanted portion 112 narrows towards the rear end 98 of the hopper 26. Preferably, the first slope has a slope from 8 to 35 degrees and more preferably from 10 to 25 degrees. The slanted portions 112 and 114 release the material in a continual and even flow to be discharged from the hopper 26 and therefore the material does not clog the hopper 26.

The second slanted portion 114 has a first width 120 at the front end 96 and a second width 122 at the rear end 98, the first width 120 being smaller than the second width 122. In other words, the second slanted portion 114 widens toward the rear end 98 of the hopper 26. In the preferred embodiment, the first slanted portion 112 is between two second slanted portions 114. The second slanted portions 114 are adjacent the lower side walls 108 and the first slanted portion 112. Preferably, the second slope has a slope from 8 to 35 degrees and more preferably 10 to 25 degrees.

Figure 8:
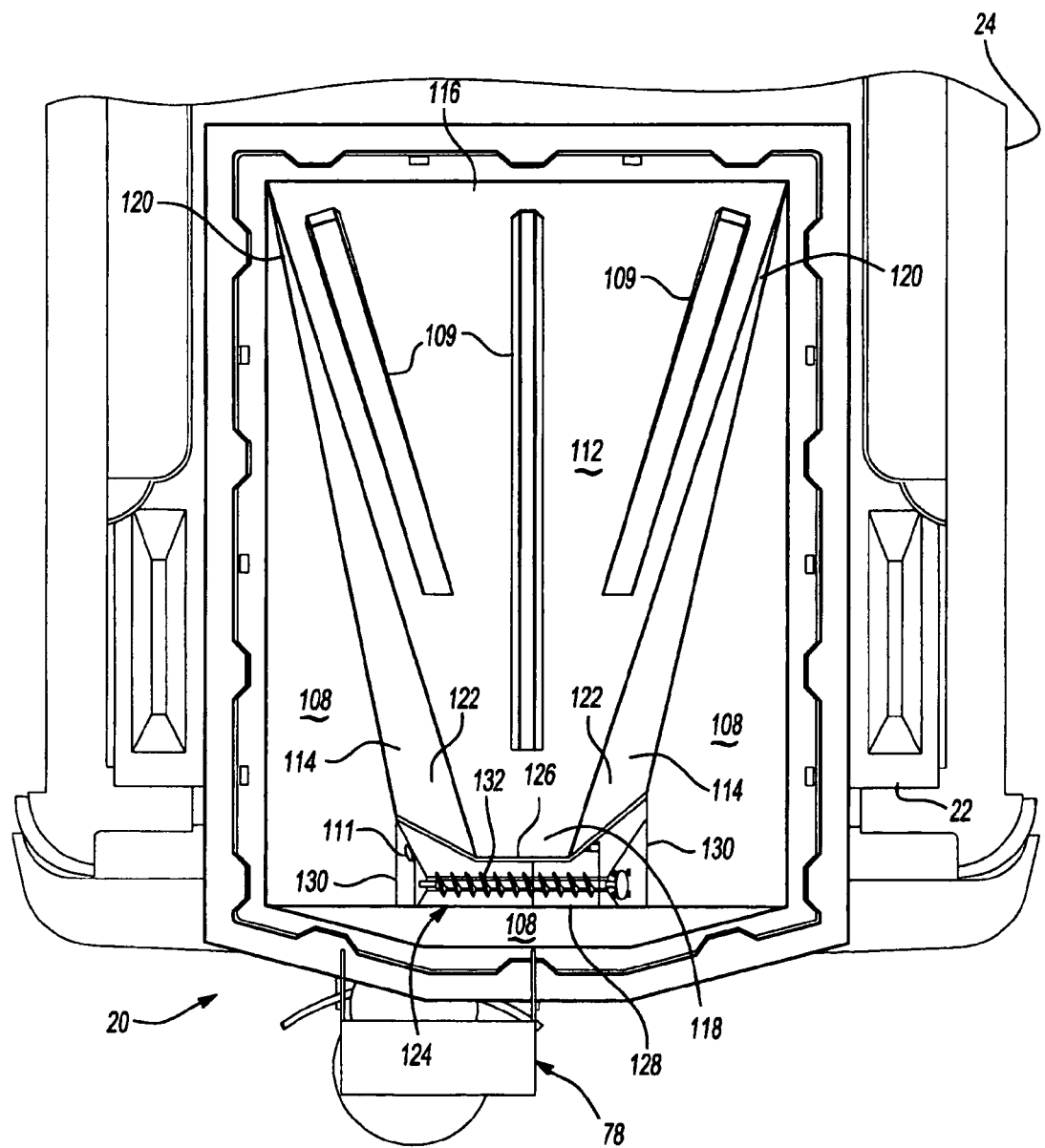
FIG. 8 is a top view of the spreader assembly mounted to the bed of the truck.

Referring to FIG. 8, a mouth 124 interconnects the sloped bottom 100 and the lower side walls 108 with the outlet spout 51 for emptying the material into the outlet spout 51. The mouth 124 includes a mouth front 126 that is an edge between the outlet spout 51 and the sloped bottom 100, and a mouth rear 128 and mouth sides 130 which are edges between the lower side walls 108. The mouth front 126 has a first edge aligned with the first slanted portion 112 and a second edge aligned with the second slanted portion 114. Since the first slanted portion 112 and the second slanted portion 114 have different slopes, the second edges are slanted in order to connect the first edge to the mouth sides 130. The slanted second edge encourages the material to flow more easily into the outlet spout 51 and thereby be discharged.

Figure 9:
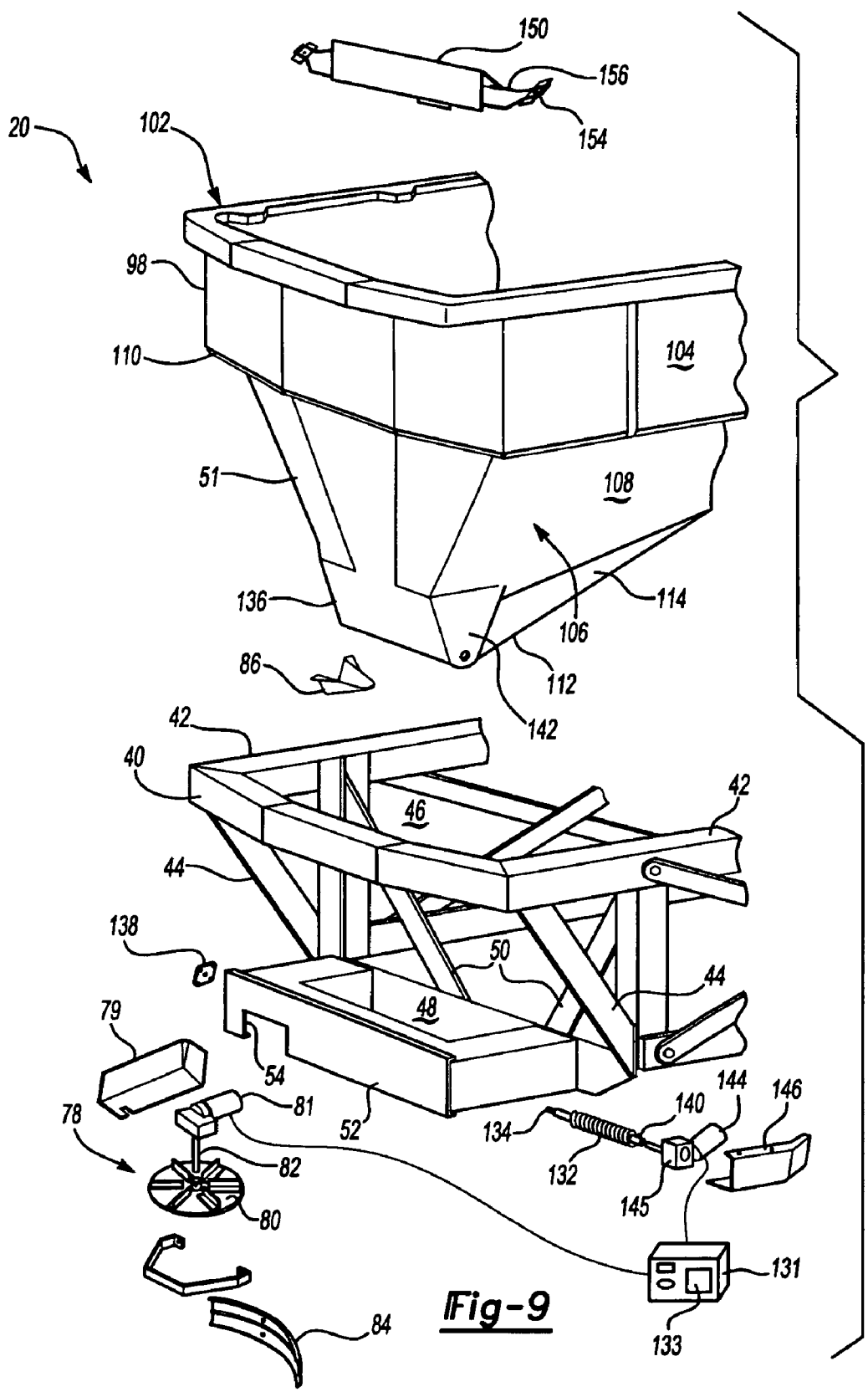
FIG. 9 is an exploded view of a rear end of the spreader assembly.

The spreader assembly 20 further includes a horizontal auger 132 that extends toward the outlet for facilitating the discharge of material from the hopper 26 through the outlet. The horizontal auger 132 is shown in FIGS. 8 and 9. The horizontal auger 132 extends the width of the truck bed 22, which reduces cost of the auger 132 and assembly 20 as opposed to running the length of the bed 22. The auger 132 is oriented such that a first end 134 extends through a side wall 136 of the outlet spout 51 and attaches to a bearing 138 to allow rotation of the auger 132. The bearing 138 is the only maintenance point and only requires greasing infrequently. A second end 140 of the auger 132 protrudes through another side wall 142 of the outlet spout 51 to a drive mechanism 145 for driving the auger 132. A motor 144 mounted outside the hopper 26 drives the drive mechanism 145. The motor 144 can operate to rotate the horizontal auger 132 clockwise and counterclockwise for preventing the auger 132 from jamming. Alternatively, a hand crank could be inserted through the access hole 111 for rotating the auger 132. Additionally, the slanted portions 112, 114 allow the motor 144 to operate at a lower amperage because the material flows evenly to the horizontal auger 132. For example, the motor 144 operates at 12 Amps whereas other related art motors operate at 60 Amps. This allows for the motor 144 to be smaller and more efficient, and the assembly 20 more cost effective.

A controller 131 is capable of controlling both the motor 144 of the auger 132 and the motor 81 of the spinner 78. The controller 131 has infinite control and typically operates the two motors 144, 81. Preferably, the controller 131 is housed within the vehicle. The spinner motor 81 to spinner transmission has reduction ratio of 8:1 and the auger motor 144 to auger transmission has a reduction ratio of 20:1. A sensor (not shown) is disposed between and in communication with the controller 131 and the motor 144 for sensing operation of the horizontal auger 132. The controller 131 senses when the horizontal auger 132 is operating and when the horizontal auger 132 is not operating because of a jam. In response to sensing the jam, the controller 131 automatically reverses the auger 132 a predetermined number of rotations. The controller 131 is connected to the motor 144 by methods known in the art of controllers. The method of sensing the operation of the horizontal auger 132 and spinner 78. The sensor may include an encoder (not shown) on each of the motors 144, 81 or may be any other sensor known in the art. Referring to FIG. 9, the controller 131 is shown connected to both motors 144, 81.

The predetermined number of rotations may be a full turn, half a turn, two turns, or any other number of turns. The controller 131 may do this four to six times or until the auger 132 is no longer jammed. Additionally, the controller 131 may display the amperage being drawn by the motor 144, which correlates to the amount of material being discharged, on a display 133. If the amperage is low, less material is being discharged then when the amperage is high. This allows the operator to know how much material is being discharged. Alternately, when the display 133 indicates a low or zero amperage, the operator may access the auger 132 from the access hole 111 to free the clogged material. A cover 146 is mounted over the drive mechanism 145 to protect the drive from the elements.

The sloped bottom 100 and lower side walls 108 of the hopper 26 directs material toward the auger 132 as the auger 132 pushes material toward the opening 101. A baffle 148 (shown in FIG. 10) covers the opening 101 and the second end 140 of the auger 132 for preventing material from freely flowing through the opening 101. The baffle 148 is affixed to the side wall 136 of the outlet spout 51. The baffle 148 may be formed in two pieces to allow removal of one part of the baffle 148 to allow additional material to flow from the hopper 26 and to prevent material, such as sand, from clogging.

Figure 10:
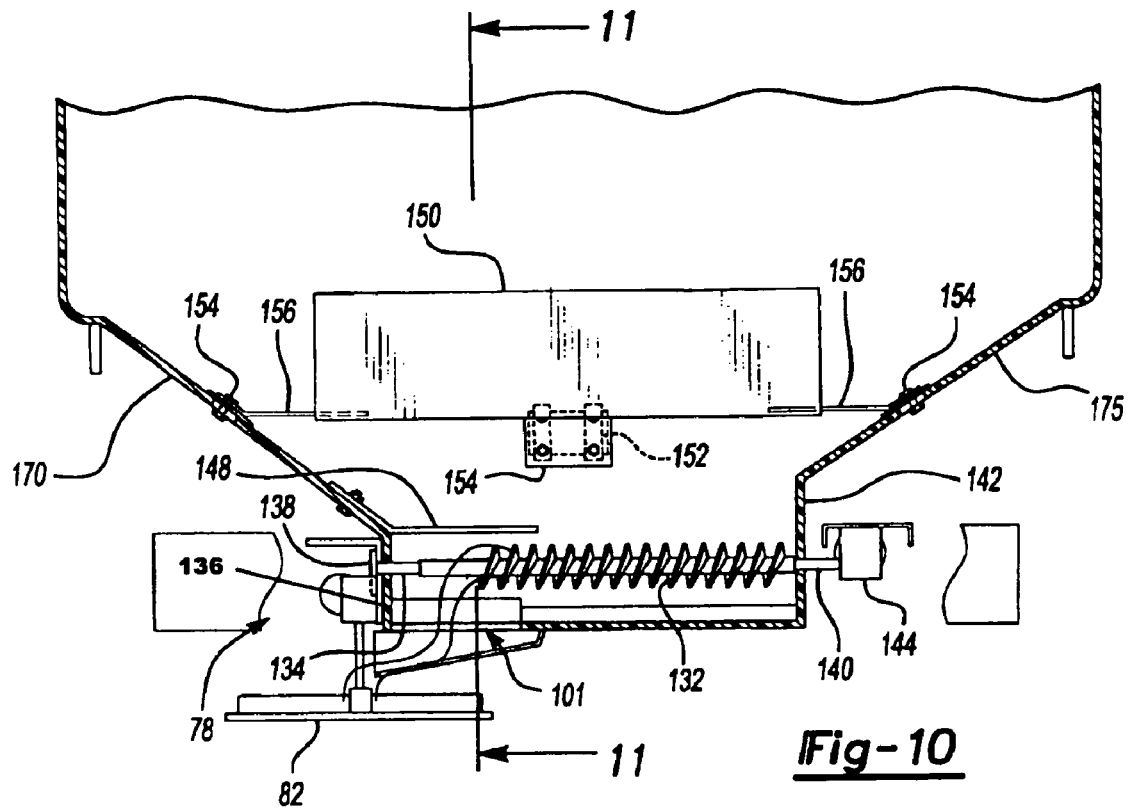
FIG. 10 is an end view of the hopper.
Figure 11:
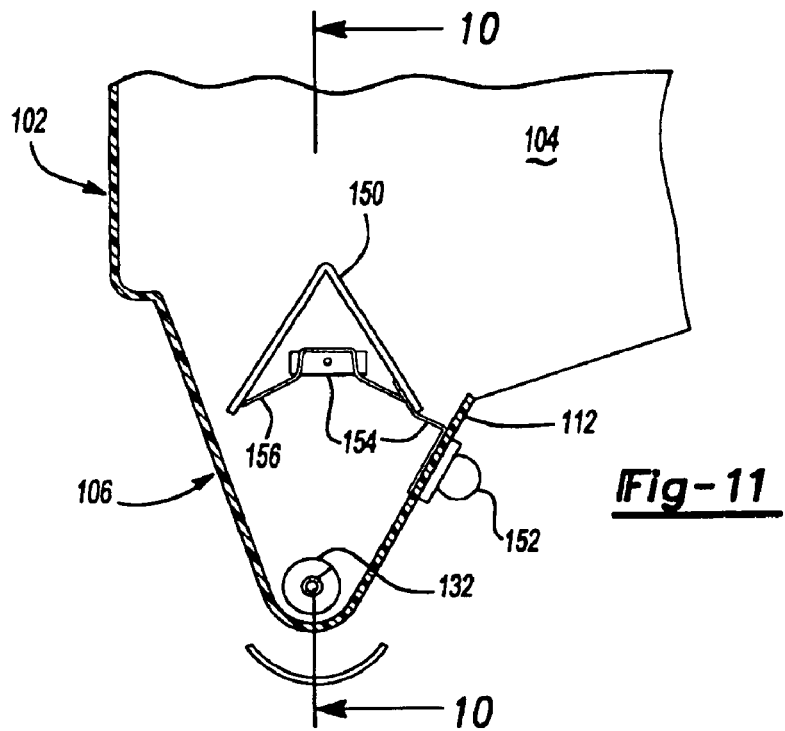
FIG. 11 is a side view of the hopper along line 11-11 of FIG. 10.

Referring to FIGS. 9, 10, and 11, a flow facilitator 150 is mounted adjacent to the horizontal auger 132 to facilitate the flow of material to auger 132. The facilitator 150 facilitates the flow of material in several ways. In the first way, facilitator 150 restricts the flow of material from within the hopper 26 to the area immediately adjacent to the auger 132. The facilitator 150 functions like a shield to control the amount of material that reaches the auger 132. The material is supported on the top of the flow facilitator 150 and flows around the edges of the facilitator 150 through the gap between the walls of the lower portion 106 of the hopper 26. A further way is that the facilitator 150 relieves weight upon the auger 132. This allows the auger 132 to begin to rotate without having to rotate under the weight of the material in the hopper 26. A still further advantage is that the facilitator 150 allows the material on the auger 132 to "burp" or heave upward when the auger 132 starts to rotate. This relieves some of the weight on the auger 132 allowing it to begin operation with less power and reducing the potential for the auger 132 to lock up. Another way is that the facilitator 150 vibrates to agitate the material within the hopper 26 so that it continues to flow around the edges of the facilitator 150 to the auger 132. The facilitator 150 functions as a chisel when vibrated to cut through the material.

As illustrated, the flow facilitator 150 is preferably a V-shaped plate and formed at about a 45 degree angle with respect to one another. The plate may be differently shaped and still accomplish the subject invention. Further, different angles of the plate may be utilized to accomplish the subject invention, for example, a 30 degree angle or a 60 degree angle may be employed. The V-shape of the plate generally defines a knife edge. A mounting bracket 154 extends from the plate to the wall of the hopper 26 and a vibrator 152 is operatively connected to the mounting bracket 154 to create vibrations with the V-shaped plate to facilitate material flow. However, the vibrator 152 may be connected directly to the flow facilitator 150. In the preferred embodiment, connecting rods 156 and mounting brackets 154 connect the plate to the side walls. The rods 156 allow material to be distributed to easily flow down to the bottom 100 of the hopper 26 without clogging the auger 132 or the opening 101. A screen may also be used to screen out larger materials thereby preventing clogging or the spreader.

With reference to FIG. 10, the side walls 108 are illustrated such that one wall 170 and the other wall 175 have different slopes. In the preferred embodiment, wall 170 has a slope of about 15 degrees and wall 175 has a slope of about 10 degrees. Varying the slope of the walls 170 and 175 facilitates the flow of the material to the auger 132.

Figure 17:
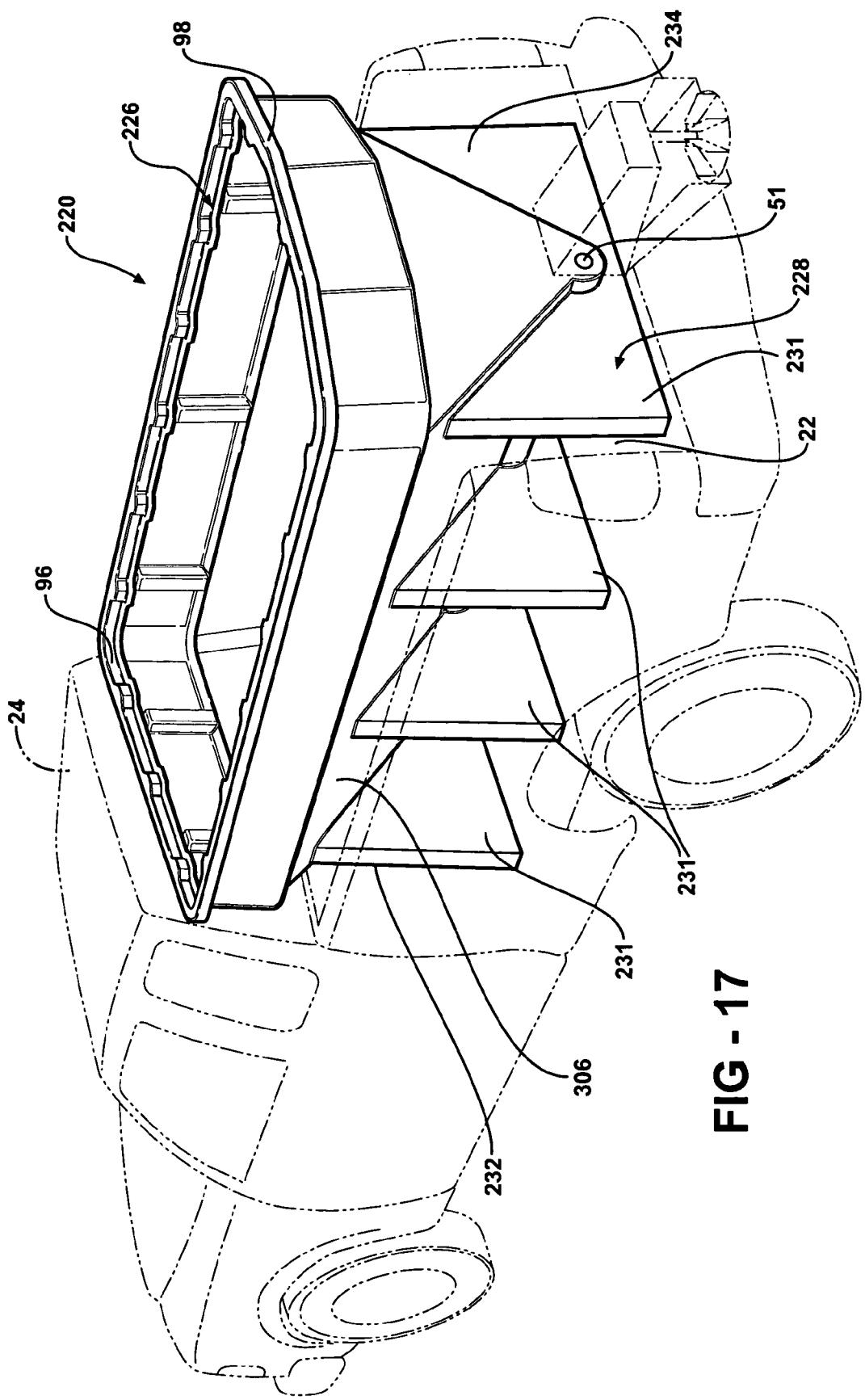
FIG. 17 is a perspective view of another embodiment of a vehicle having a spreader assembly mounted in a bed of the vehicle.

Referring to FIGS. 17 through 22, a second embodiment of the subject invention is illustrated. The second embodiment includes a spreader assembly 220 for mounting in the bed 22 of the truck 24 as shown in FIG. 17. The spreader assembly 220 comprises a hopper 226 and a frame 228. The hopper 226 has a length extending between the front end 96 and the rear end 98 and has an outlet spout 51 with an opening for discharging material therefrom. The hopper 226, as described above, is sized for placing in the bed 22 of the truck 24 and holds material for spreading. For ease of description and clarity, the second embodiment has been shown and described without the additional mechanisms described above, such as, but not limited to, the spinner 78, the auger 132, the flow facilitator 150, and the motor 144 and the drive mechanisms 145. It is to be appreciated that these additional mechanisms may or may not be employed with the second embodiment of the subject invention. The frame 228 engages the hopper 226 and supports the hopper 226 in the bed 22 of the truck 24.

Figure 18:
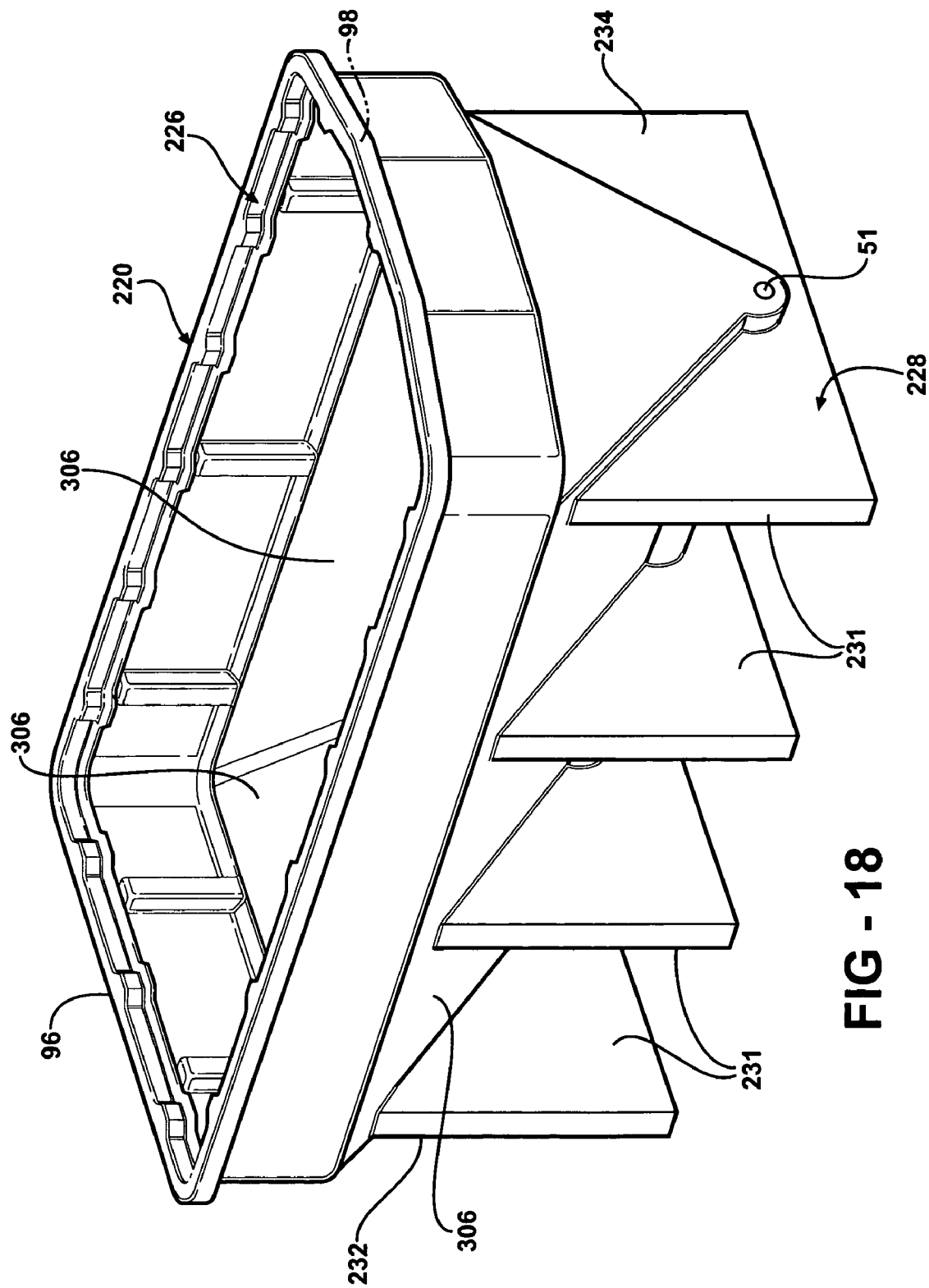
FIG. 18 is a perspective view of the spreader assembly shown in FIG. 17.

FIG. 18 is a perspective side view of the spreader assembly 220 removed from the bed 22 of the truck 24. In the second embodiment, both the hopper 226 and the frame 228 are formed from a thermoplastic material and the hopper 226 and the frame 228 are integrally connected to one another such that the hopper 226 and the frame 228 are unitary. It is to be appreciated by those of ordinary skill in the art that the frame 228 may be formed separate from the hopper 226 and then the frame 228 is secured to the hopper 226 to form the unitary structure. For example, since both the frame 228 and the hopper 226 are formed of thermoplastic materials, the frame 228 and the hopper 226 may be hot melted together or secured together with an adhesive that causes either chemical or mechanical bonding therebetween. Alternatively, the hopper 226 and the frame 228 may be formed from a continuous and homogenous material. For example, both the hopper 226 and the frame 228 could be formed in a single rotational molding process as described above.

Figure 19:
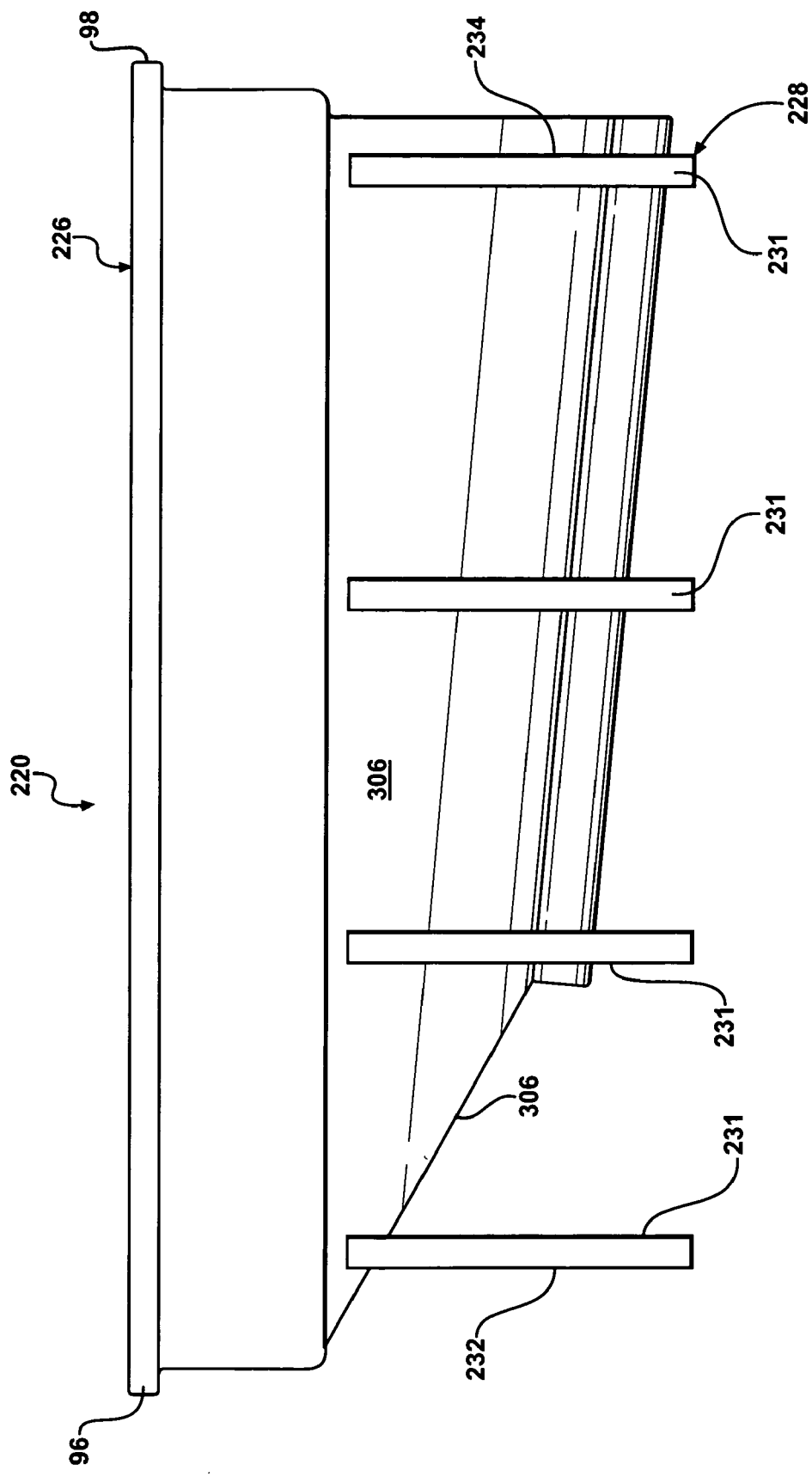
FIG. 19 is a side view of the spreader assembly shown in FIG. 17.
Figure 20:
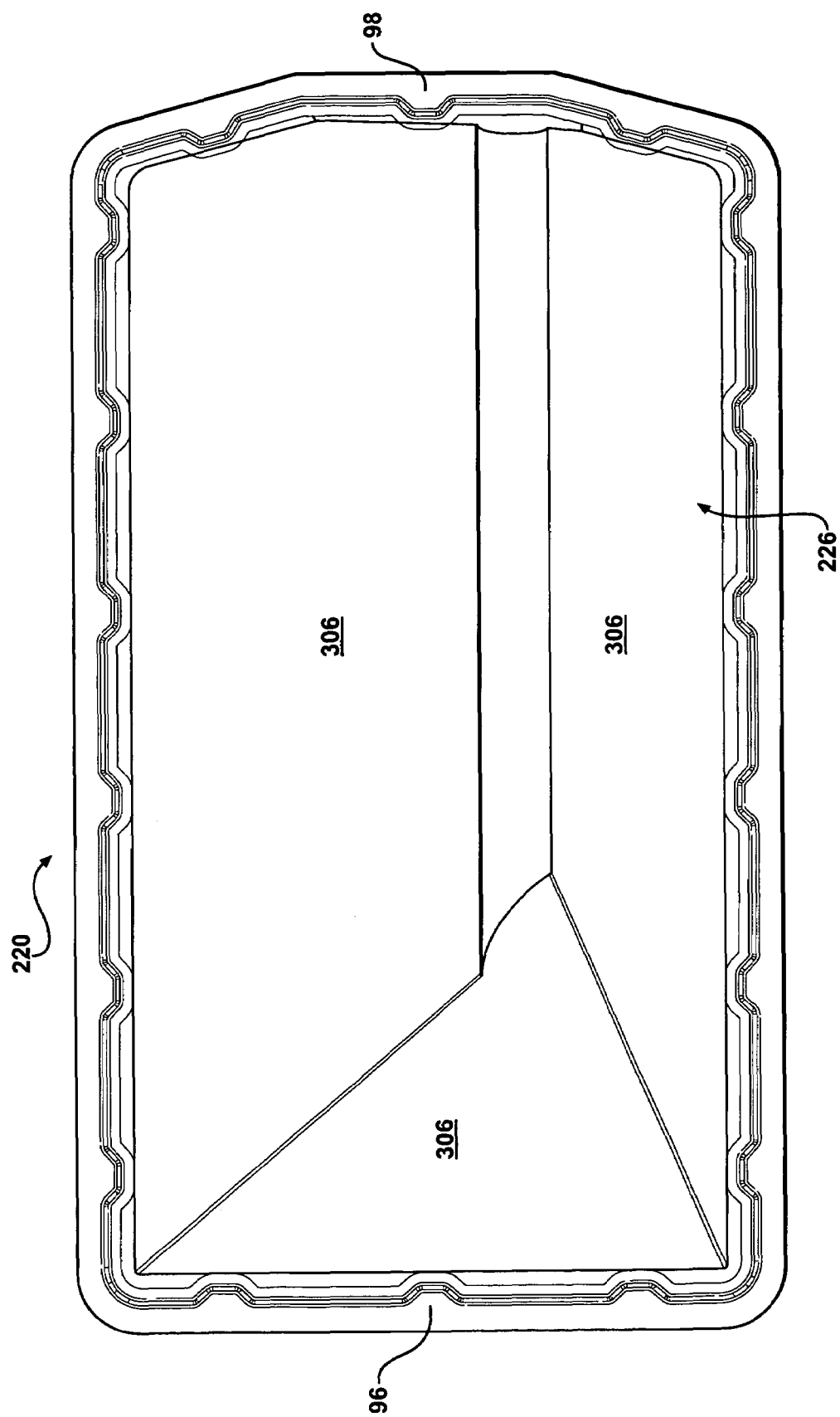
FIG. 20 is a top view of the spreader assembly shown in FIG. 17.

In order to adequately support the hopper 226, the frame 228 includes a plurality of supports 231 longitudinally spaced along the length of the hopper 226. At a minimum, a first support 232 at the front end 96 and a second support 234 at the rear end 98 are needed to support the spreader assembly 220. A side view of the spreader assembly 220 is illustrated in FIG. 19 having four supports 231 spaced an equal distance apart along the length of the spreader assembly 220. The second embodiment of the spreader assembly 220 has the hopper 226 further comprising a lower portion 306 having at least one sloped surface to facilitate discharge of the material from the hopper 226. In this embodiment, the auger (not shown) may extend along the length of the hopper 226 and at a slight incline to facilitate the movement of the material within the hopper 226. FIG. 20 is a top view of the spreader assembly 220 illustrating the configuration of the hopper 226.

Figure 21:
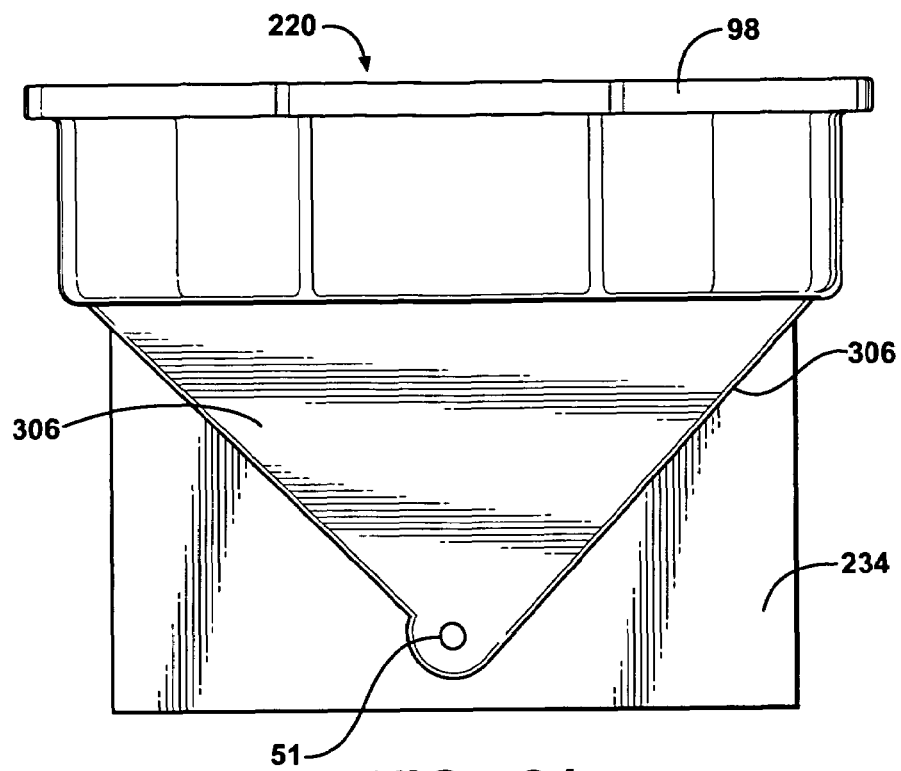
FIG. 21 is a rear view of the spreader assembly shown in FIG. 17
Figure 22:
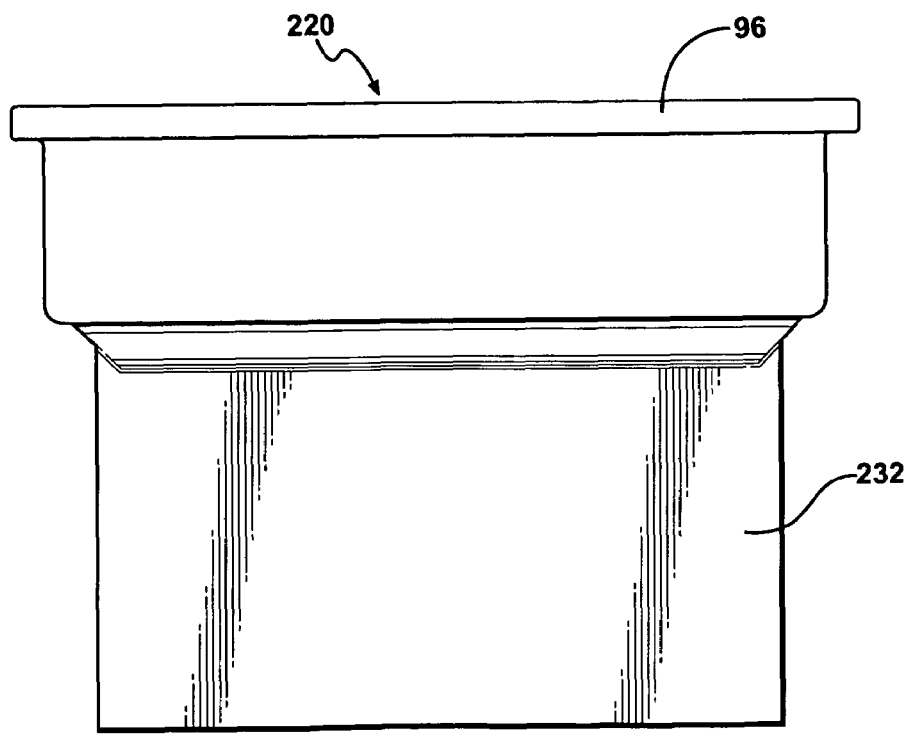
FIG. 22 is a front view of the spreader assembly shown in FIG. 17.

FIG. 21 is rear view of the spreader assembly 220 and FIG. 22 is a front view of the spreader assembly 220. As illustrated, the first and the second supports 232, 234 extend substantially across a width of the hopper 226. Since the supports 232, 234 extend substantially across the width, the hopper 226 is able to carry significant amounts of material and be adequately supported. Further, these supports 232, 234 allow the hopper 226 to be formed of a lightweight material while still supporting the weight of the material.

Figure 23:
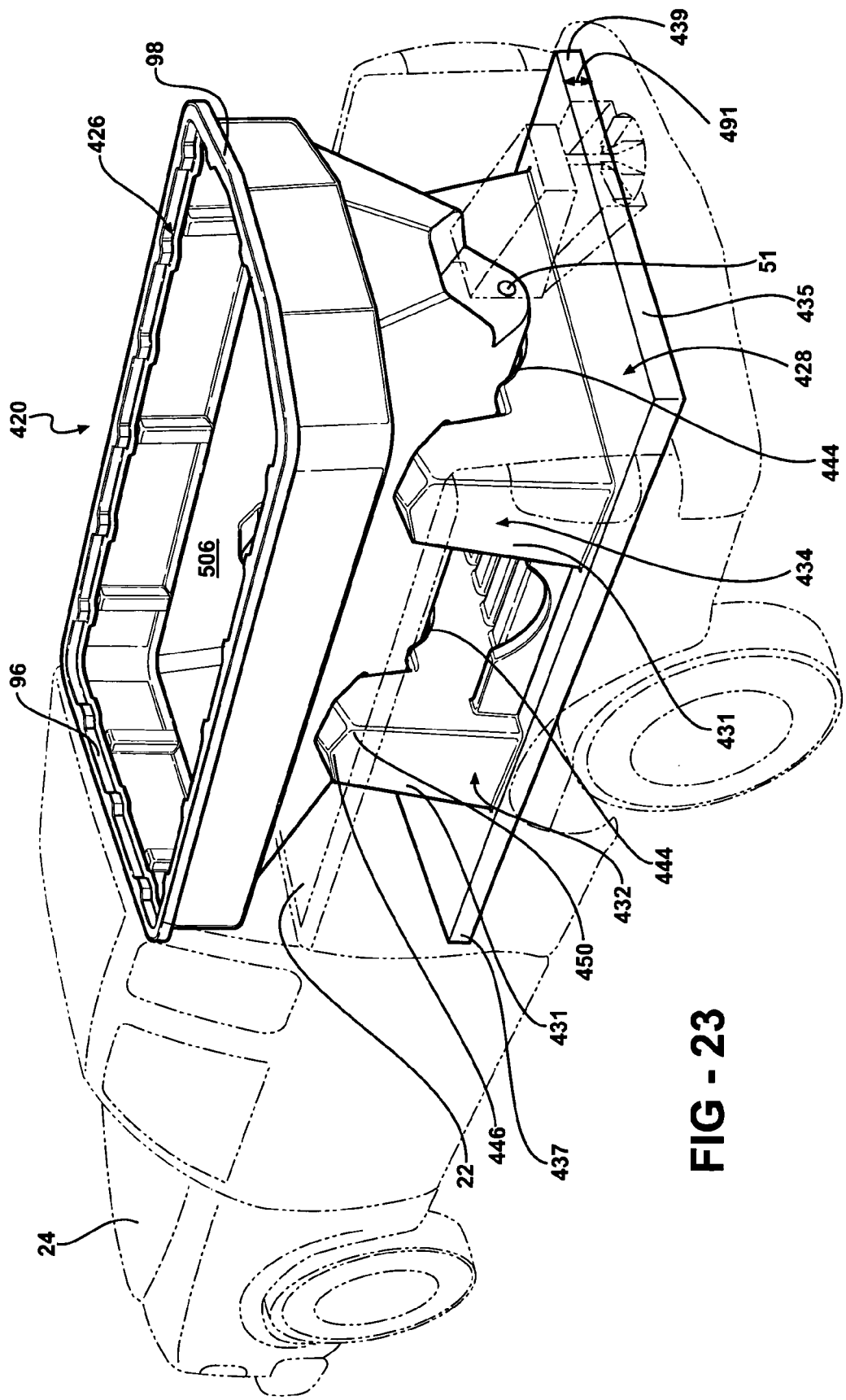
FIG. 23 is a perspective view of yet another embodiment of a vehicle having a spreader assembly mounted in a bed of the vehicle.

Referring to FIGS. 23 through 29, a third embodiment of the subject invention is illustrated. The third embodiment includes a spreader assembly 420 for mounting in the bed 22 of the truck 24 as shown in FIG. 23. The spreader assembly 420 comprises a hopper 426 and a frame 428. The hopper 426 has a length extending between the front end 96 and the rear end 98 and has an outlet spout 51 with an opening for discharging material therefrom. The hopper 426, as described above, is sized for placing in the bed 22 of the truck 24 and holds material for spreading. For ease of description and clarity, the third embodiment has been shown and described without the additional mechanisms described above, such as, but not limited to, the spinner 78, the auger 132, the flow facilitator 150, and the motor 144 and the drive mechanisms 145. It is to be appreciated that these additional mechanisms may or may not be employed with the third embodiment of the subject invention.

Figure 24:
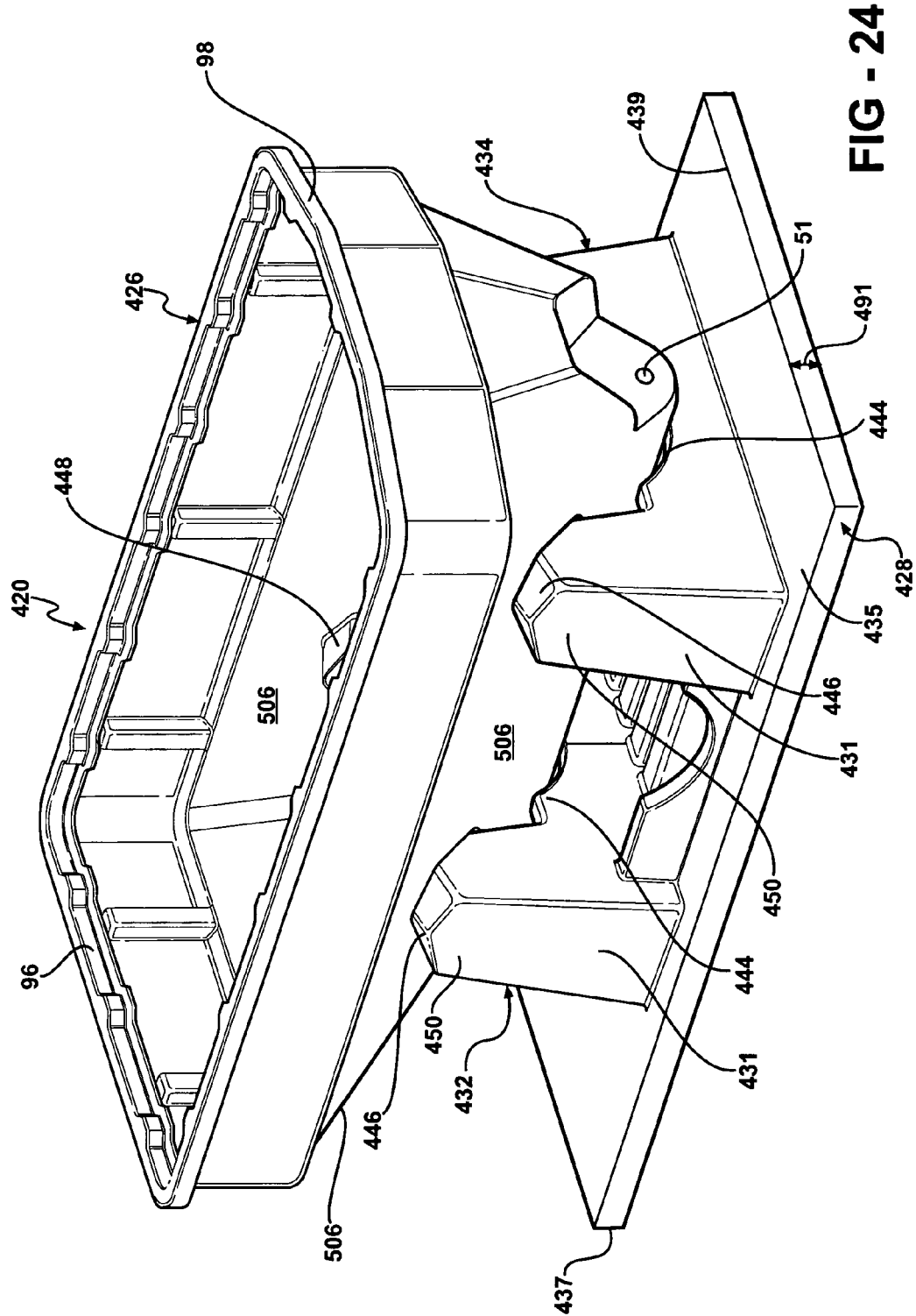
FIG. 24 is a perspective view of the spreader assembly shown in FIG. 23 having a hopper and a base.
Figure 25:
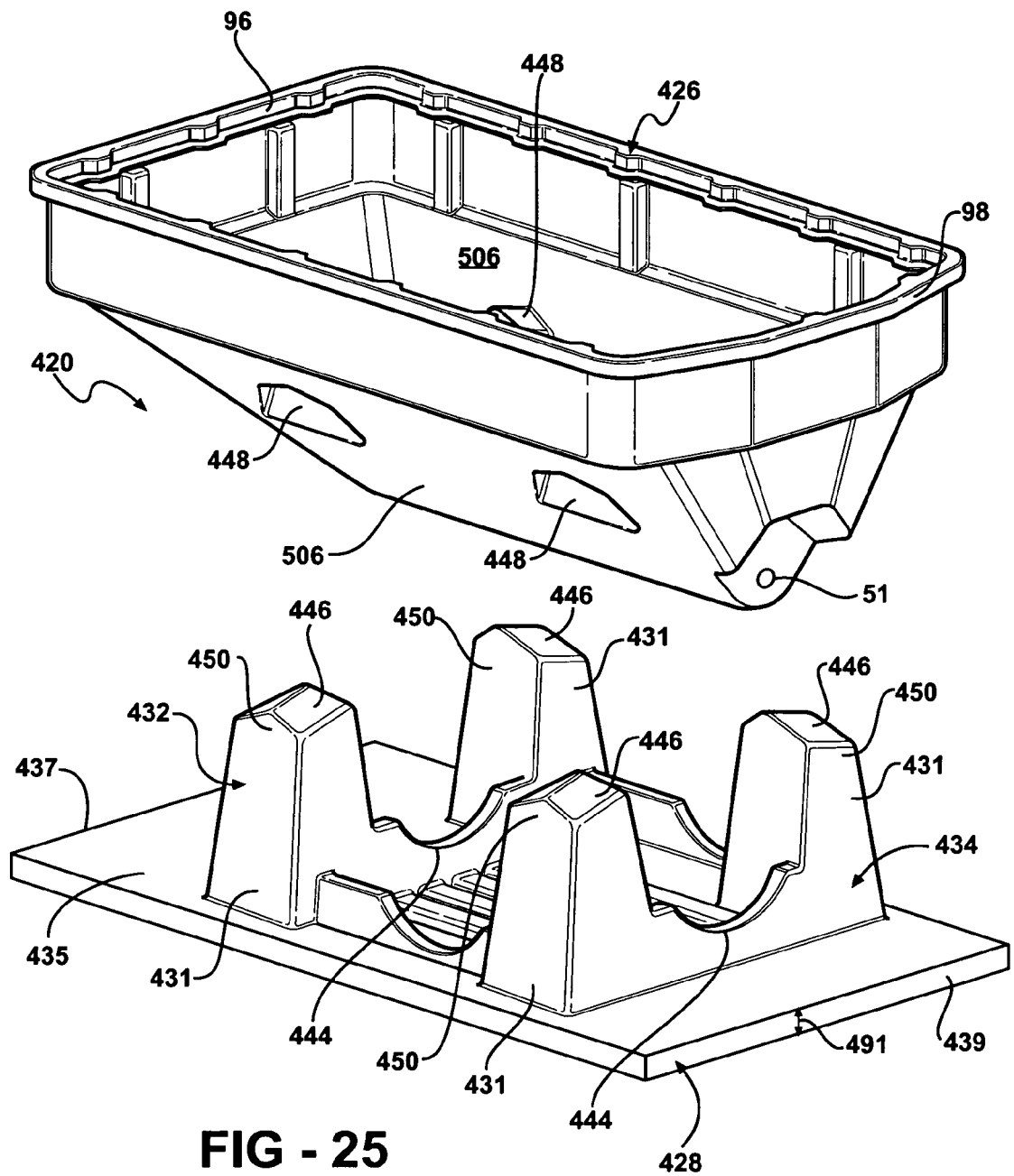
FIG. 25 is an exploded perspective view of the hopper and the base shown in FIG. 24.

FIG. 23 is a perspective side of the spreader assembly 420 of the third embodiment mounted in the bed 22 of the truck 24. FIG. 24 is a perspective side view of the spreader assembly 420 removed from the bed 22 of the truck 24. In the third embodiment, both the hopper 426 and the frame 428 are formed from a thermoplastic material; however, the hopper 426 and the frame 428 are removable from one another such that the hopper 426 and the frame 428 are separate units. FIG. 25 is an exploded perspective side view of the hopper 426 and the frame 428.

The frame 428 includes a base 435 and a plurality of posts 431 for supporting the hopper 426. The base 435 has a length extending between a front end 437 and a rear end 439 and is sized for being received within the bed 22 of the truck 24. For example, the base 435 may be rectangularly shaped for fitting within the bed 22 of the truck 24. The base 435 may also have a desired height 491 for dissipating the weight of the hopper 426 and the material. However, the larger the height 491 of the base 435, the heavier the base 435 may become, which might make it more difficult to remove the base 435 from the truck bed 22.

The base 435 further comprises a supporting surface 444 extending between the pairs of posts 431 for supporting the hopper 426. For example, the supporting surface 444 may be shaped to receive the hopper 426. The supporting surface 444 distributes the weight of the hopper 426 and, more importantly, the material to the base 435. The supporting surface 444 also allows the hopper 426 to be formed of a light-weight material while still be able to support large amount of material to be spread since the weight is transferred to the base 435. FIGS. 27 and 28 are rear and front views of the frame 428 supporting the hopper 426 with the hopper 426 engaging the supporting surfaces 444.

Referring back to FIG. 25, a pair of front posts 432 extend upwardly from the base 435 at the front end 437 and a pair of rear posts 434 extend upwardly from the base 435 at the rear end 439. The posts 432, 434 engage the hopper 426 and support the hopper 426 in the bed 22 of the truck 24. It is to be appreciated by one of ordinary skill in the art that more than two pairs of posts may be used to support the hopper 426. In the third embodiment, the base 435 and the posts 432, 434 are each formed from a thermoplastic material. For example, the base 435 and the posts 432, 434 may be integrally formed as a unitary structure for supporting the removable hopper 426. FIG. 26 is a side view of the frame 428 having the posts 431 engaging and supporting the hopper 426.

Referring again to FIG. 25, each of the posts 431 also includes an interlock 446 for engaging the hopper 426 to limit movement during operation. The interlock 446 may directly engage the side of the hopper 426 to secure the hopper 426 in place. Alternatively, the hopper 426 may have complementary indentations 448 for receiving the interlock 446 to secure the hopper 426 to the frame 428. The interlock 446 may have an angled surface to provide additional stability for mating with at least one indentation formed in the hopper 426. The angled surfaces are disposed at a distal portion 450 of the posts 431 and the indentations 448 of the hopper 426 are correspondingly slanted for mating with the interlock 446.

Figure 29:
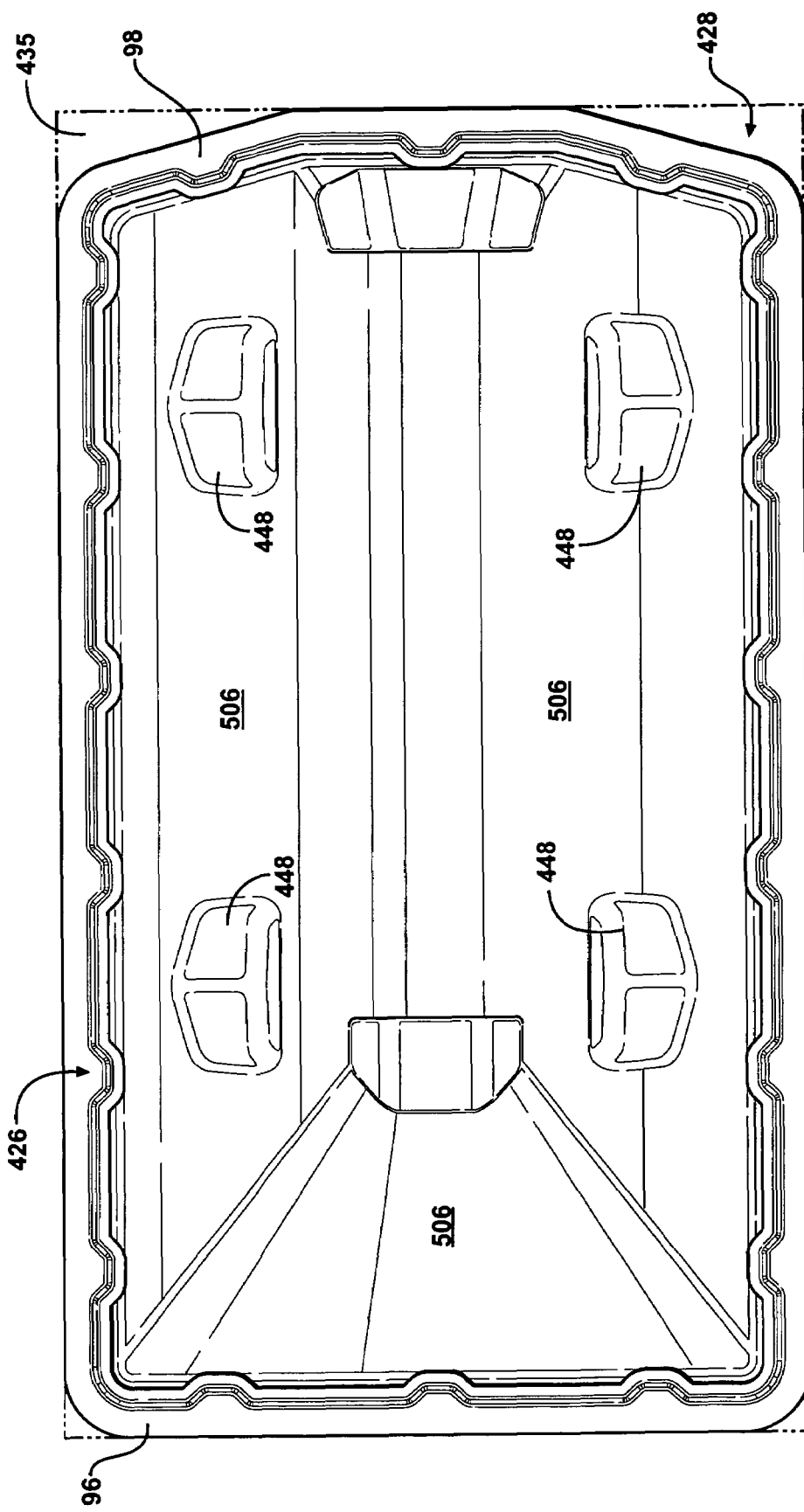
FIG. 29 is a top view of the spreader assembly shown in FIG. 24.

FIG. 29 is a top view of the hopper 426. The hopper 426 further comprises the lower portion 506 having at least one sloped surface to facilitate discharge of the material from the hopper 426. The indentations 448 may be disposed within the sloped surface and may be slanted as shown in FIG. 29. In the third embodiment, the auger (not shown) may be positioned extending along the length of the hopper 426 and in a substantially horizontal position, in contrast to the slanted position of the auger of the second embodiment. The position of the auger in either embodiment may be altered without impacting the subject invention.

Obviously, many modifications and variations of the present invention are possible in light of the above teachings. The invention may be practiced otherwise than as specifically described within the scope of the appended claims. The invention has been described in an illustrative manner, and it is to be understood that the terminology, which has been used, is intended to be in the nature of words of description rather than of limitation.

What is claimed is:

1. A spreader assembly for mounting in a bed of a truck, said assembly comprising:
    a hopper having a length extending between a front end and a rear end sized for placing in the bed of the truck to hold material for spreading and having an outlet spout with an opening for discharging material therefrom;
    a spinner connected to a drive mechanism for driving said spinner, said spinner being mounted adjacent said outlet spout for receiving materials from said outlet spout and for throwing material over a large distribution area;
    a frame engaging said hopper for supporting said hopper in the bed of the truck; and
    said hopper and said frame are each formed from a thermoplastic material;
    a flow facilitator coupled to said hopper and a vibrator operatively connected to said flow facilitator for vibrating said flow facilitator to prevent cavitation of said material.

2. An assembly as set forth in claim 1 wherein said hopper and said frame are further defined as being integrally connected to one another such that said hopper and said frame are unitary.

3. An assembly as set forth in claim 2 wherein said frame further comprises a plurality of supports longitudinally spaced along said length of said hopper.

4. An assembly as set forth in claim 3 further comprising a first support at said front end and a second support at said rear end.

5. An assembly as set forth in claim 4 wherein said first and said second supports are further defined as extending substantially across a width of said hopper.

6. An assembly as set forth in claim 3 wherein said hopper further comprises a lower portion having at least one sloped surface to facilitate discharge of the material from said hopper.

7. An assembly as set forth in claim 6 further comprising an auger disposed within said hopper to facilitate flow of the material from said hopper.

8. An assembly as set forth in claim 1 wherein said hopper and said frame are further defined as being removable from one another such that said hopper and said frame are separate units.

9. An assembly as set forth in claim 8 wherein said frame further comprises a pair of front posts at said front end and a pair of rear posts at said rear end engaging said hopper for supporting said hopper in the bed.

10. An assembly as set forth in claim 9 wherein said frame further comprises a base supporting said posts and sized to be received within the bed.

11. An assembly as set forth in claim 10 wherein said base and said posts are integrally formed.

12. An assembly as set forth in claim 9 wherein said posts further comprise an interlock to secure said hopper to said frame for limiting movement of said assembly.

13. An assembly as set forth in claim 12 wherein said hopper is further defined as having at least one indentation sized to receive said interlock.

14. An assembly as set forth in claim 13 wherein said hopper further comprises a lower portion having at least one sloped surface to facilitate discharge of the material from said hopper.

15. An assembly as set forth in claim 14 further comprising an auger disposed within said hopper to facilitate flow of the material from said hopper.

16. A spreader assembly for mounting in a bed of a truck, said assembly comprising:
    a hopper having a length extending between a front end and a rear end sized for placing in the bed of the truck to hold material for spreading and having an outlet spout with an opening for discharging material therefrom;
    a spinner connected to a drive mechanism for driving said spinner, said spinner being mounted adjacent said outlet spout for receiving materials from said outlet spout and for throwing material over a large distribution area;
    a frame engaging said hopper for supporting said hopper in the bed of the truck; and
    said hopper and said frame are each formed from a thermoplastic material;
    said hopper and said frame are further defined as being removable from one another such that said hopper and said frame are separate units, said frame further comprises a pair of front posts at said front end and a pair of rear posts at said rear end engaging said hopper for supporting said hopper in the bed said posts further comprise an interlock to secure said hopper to said frame for limiting movement of said assembly.

17. An assembly as set forth in claim 16 further comprising an auger disposed within said hopper to facilitate flow of the material from said hopper.

18. An assembly as set forth in claim 17 further comprising a flow facilitator positioned within said hopper adjacent said auger for facilitating flow of material to said auger.

19. An assembly as set forth in claim 18 wherein said flow facilitator is coupled to said hopper.

20. An assembly as set forth in claim 19 further comprising a vibrator operatively connected to said flow facilitator for vibrating said flow facilitator to prevent cavitation of the material adjacent said auger.

* * * * *